US010850606B2

(12) United States Patent
Niwa et al.

(10) Patent No.: US 10,850,606 B2
(45) Date of Patent: Dec. 1, 2020

(54) COVER MEMBER FOR FUEL TANK

(71) Applicant: AISAN KOGYO KABUSHIKI KAISHA, Obu (JP)

(72) Inventors: Kensuke Niwa, Nagoya (JP); Koji Yoshida, Kasugai (JP); Akira Iida, Tokai (JP); Shinya Higashi, Kasugai (JP); Morihiro Takemura, Nisshin (JP); Hiroyasu Kariya, Kariya (JP); Tatsuki Fukui, Novi, MI (US); Takuhito Fujiwara, Obu (JP); Takeaki Morizono, Tsushima (JP); Takehiro Yamauchi, Obu (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 39 days.

(21) Appl. No.: 16/077,677

(22) PCT Filed: Jan. 13, 2017

(86) PCT No.: PCT/JP2017/001007
§ 371 (c)(1),
(2) Date: Aug. 13, 2018

(87) PCT Pub. No.: WO2017/141595
PCT Pub. Date: Aug. 24, 2017

(65) Prior Publication Data
US 2019/0047405 A1 Feb. 14, 2019

(30) Foreign Application Priority Data

Feb. 19, 2016 (JP) .................. 2016-029968

(51) Int. Cl.
*B60K 15/035* (2006.01)
*F02M 37/10* (2006.01)
(Continued)

(52) U.S. Cl.
CPC ........ *B60K 15/03504* (2013.01); *B65D 51/16* (2013.01); *F02M 37/0076* (2013.01);
(Continued)

(58) Field of Classification Search
CPC ........... B60K 15/03504; F02M 37/103; F02M 37/0076; F02M 37/10; B65D 51/16
See application file for complete search history.

(56) References Cited

U.S. PATENT DOCUMENTS 6,691,889 B1 * 2/2004 Falk ....................... B60K 15/03
220/562
7,415,974 B2 8/2008 Akiba et al.
2017/0356408 A1 * 12/2017 Yang .................. F02M 37/0047

FOREIGN PATENT DOCUMENTS

JP        2000-8985 A    1/2000
JP      2000161167 A    6/2000
(Continued)

OTHER PUBLICATIONS

International Patent Application No. PCT/JP2017/001007 International Search Report and Written Opinion dated Apr. 4, 2017 (8 pages).
(Continued)

Primary Examiner — Shawn M Braden
(74) Attorney, Agent, or Firm — Conley Rose, P.C.

(57) ABSTRACT

A flange main body as a cover member for a fuel tank includes a cover plate for closing an opening of the fuel tank, an accommodating tubular portion formed as part of the cover plate so as to extend through the plate in a plate thickness direction, and a rib formed at the cover plate. The accommodating tubular portion and the rib are formed to be non-contiguous.

20 Claims, 15 Drawing Sheets

(51) Int. Cl.
　　　*B65D 51/16*　　(2006.01)
　　　*F02M 37/00*　　(2006.01)
　　　*B60K 15/03*　　(2006.01)

(52) U.S. Cl.
　　　CPC ... *F02M 37/103* (2013.01); *B60K 2015/0319* (2013.01); *B60K 2015/03256* (2013.01); *B60K 2015/03514* (2013.01); *B60K 2015/03523* (2013.01)

(56)　　　　　　References Cited

FOREIGN PATENT DOCUMENTS

| JP | 2006-009583 | A | 1/2006 |
| JP | 2007-64100 | A | 3/2007 |
| JP | 2007064100 | A | 3/2007 |
| JP | 2007239681 | A | 9/2007 |
| JP | 2012-237227 | A | 12/2012 |
| JP | 2013-221470 | A | 10/2013 |
| JP | 2014-34224 | A | 2/2014 |

OTHER PUBLICATIONS

Japanese Patent Application No. 2016-029968 Notice of Reasons for Refusal dated Sep. 30, 2019 (8 pages).
Indian Patent Application No. 201817030737 Examination Report dated Jun. 12, 2020 (6 pages).
International Patent Application No. PCT/JP2017/001007 International Preliminary Report on Patentability dated Aug. 21, 2018 (9 pages).
Japanese Patent Application No. 2016-029968 Notice of Reasons for Refusal dated Apr. 28, 2020 (6 pages).
Japanese Patent Application No. 2016-029968 Decision of Refusal dated Aug. 21, 2020 (7 pages).
Indonesian Patent Application No. PID201806241 Notice of the Result of Substantive Examination dated Aug. 18, 2020 (4 pages).

* cited by examiner

COVER MEMBER FOR FUEL TANK

CROSS-REFERENCE TO RELATED APPLICATIONS

The present application is a U.S. National Phase entry of, and claims priority to, PCT Application No. PCT/JP2017/001007 filed Jan. 13, 2017, which claims priority to Japanese Patent Application No. 2016-029968, filed Feb. 19, 2016, both of which are incorporated herein by reference in their entireties for all purposes.

STATEMENT REGARDING FEDERALLY SPONSORED RESEARCH OR DEVELOPMENT

Not applicable.

BACKGROUND

The present disclosure relates to a cover member for a fuel tank.

A cover member for a fuel tank as a conventional example, is disclosed, for example, in Japanese Laid-Open Patent Publication No. 2012-237227 (Hereinafter, referred to as "the '227 Publication"). The cover member for the fuel tank in the '227 Publication (corresponding to a "flange") includes a cover plate made of resin for closing an opening of the fuel tank, a tubular portion (corresponding to a "connector") formed on the cover plate so as to extend through in a plate thickness direction, and a rib (corresponding to a "rib") formed in a grid-like shape on the underside of the cover plate.

According to the cover member of the '227 Publication, the tubular portion and the rib are continuous with each other. Some fuel tanks for which a cover member is used, may deform i.e., expand or contract, due to the variation of internal pressure within the tank due to the variation of temperature and/or an amount of fuel within the tank. For example, a center portion of the cover member may deform such that it rises upward as the fuel tank expands. In this case, there has been a problem that tensile stress caused in accordance with the deformation traverses from the rib, and concentrates at a base portion of the tubular portion. Therefore, due to the increase of accumulated stress, there is an increased possibility of deformation at the base portion of the tubular portion of the cover member. Thus, there has conventionally been a need to provide a cover member for a fuel tank that is capable of relieving stress concentration applied at the base portion of a tubular portion of the cover member to prevent its deformation.

BRIEF SUMMARY

According to one aspect of the present disclosure, a cover member for a fuel tank includes a cover plate for closing an opening of the fuel tank, a tubular portion formed at the cover plate so as to extend in a vertical direction of a plate thickness, and a rib formed on the cover plate. The tubular portion is non-contiguous with the rib. With this structural configuration, the tensile stress caused by the flexural deformation of the cover member does not traverse from the rib to a base portion of the tubular portion. In this way, it is possible to relieve the concentration of stress applied to the base portion of the tubular portion of the cover member.

According to another aspect of the present disclosure, the cover plate is formed with a fitting tubular portion configured to be fitted into the opening of the fuel tank. The tubular portion and the rib are arranged inside of the fitting tubular portion. With this configuration, the tubular portion and the rib are arranged inside of the fitting tubular portion of the cover plate, susceptible to any occurring deformation of the fuel tank. It is possible to effectively reduce influence exerted upon the base portion of the tubular portion due to the deformation of the fuel tank with the structural configuration of the present disclosure. The tubular portion and/or the rib may be arranged closer to the inner side of the tank than the fitting tubular portion or may be formed inside of the fitting tubular portion.

According to another aspect of the present disclosure, the tubular portion may be configured so as to be capable of accommodating a component. The tubular portion includes an attachment portion configured to be able to attach said component. With this configuration, it is possible to accommodate the component in the tubular portion and to attach the component to the tubular portion via the attachment portion.

According to another aspect of the present disclosure, the component accommodated by the tubular portion may be a valve device.

DETAILED DESCRIPTION

Hereinafter, one exemplary embodiment for carrying out the present disclosure will be described with reference to the drawings. Because a cover member for a fuel tank according to the present embodiment is provided as part of a fuel supply device, the cover member will be described in conjunction with the fuel supply device. The fuel supply device according to the present embodiment serves to supply fuel within the fuel tank mounted on a vehicle such as an automobile to an engine such as an internal combustion engine. FIGS. 1 to 5 show a fuel supply device installed into the fuel tank. In FIGS. 1 to 5, each of the frontward, rearward, rightward, leftward, upward and downward directions corresponds to each direction of the vehicle upon which the device may be fitted. More specifically, the front-to-rear direction corresponds to the longitudinal direction of vehicle length, the left-to-right direction corresponds to the direction of a vehicle width and the up-and-down direction corresponds to a direction of vehicle height. The leftmost drawing of FIG. 5 shows the area surrounding a left connecting shaft, the middle drawing of FIG. 5 shows the area surrounding an interval restricting means, and the rightmost drawing of FIG. 5 shows the area surrounding a left connecting shaft. The fuel supply device may be oriented in any direction with respect to the front-to-rear as well as the left-to-right directions.

Figure 2:
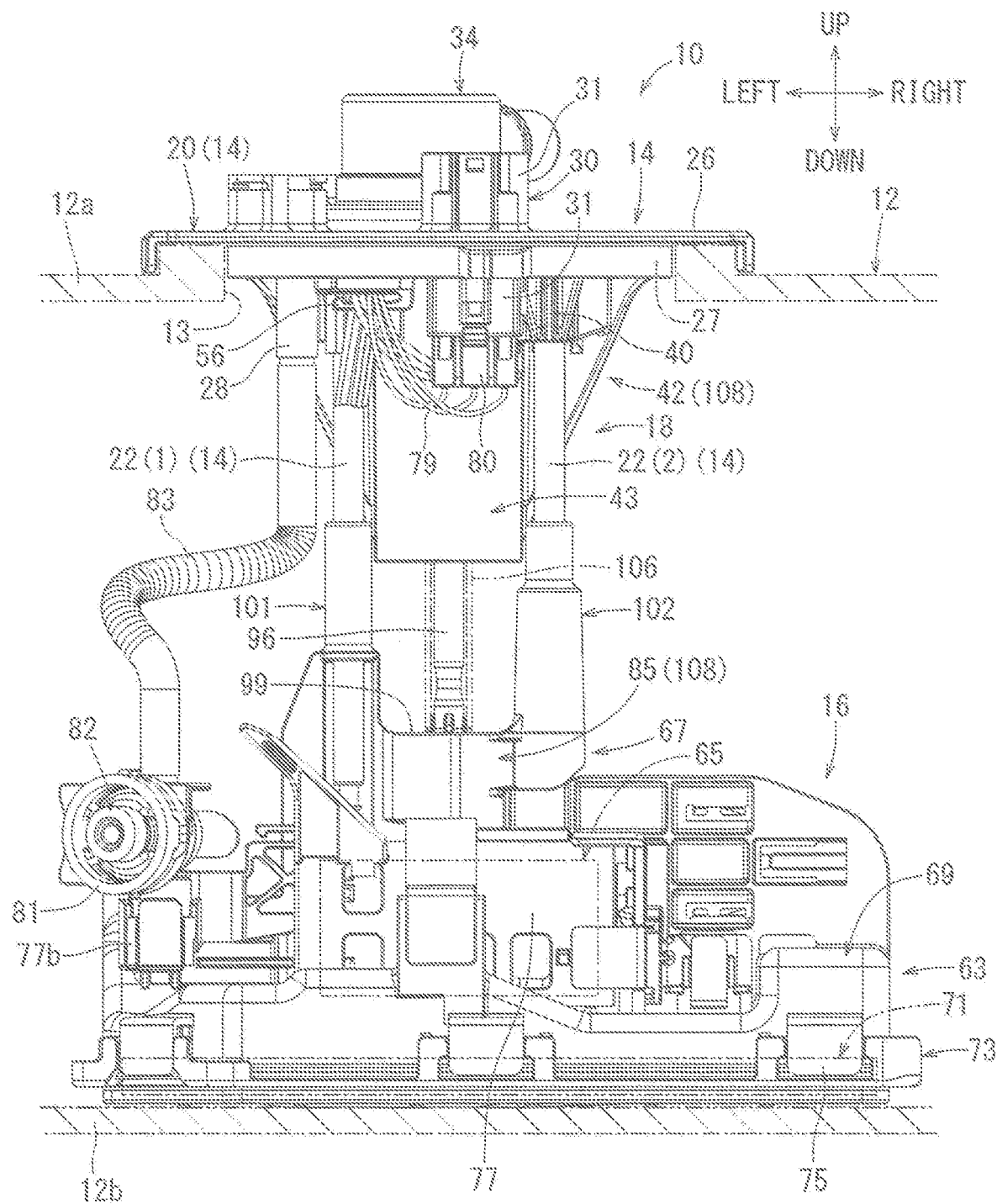
FIG. 2 is a front view of the fuel supply device.
Figure 3:
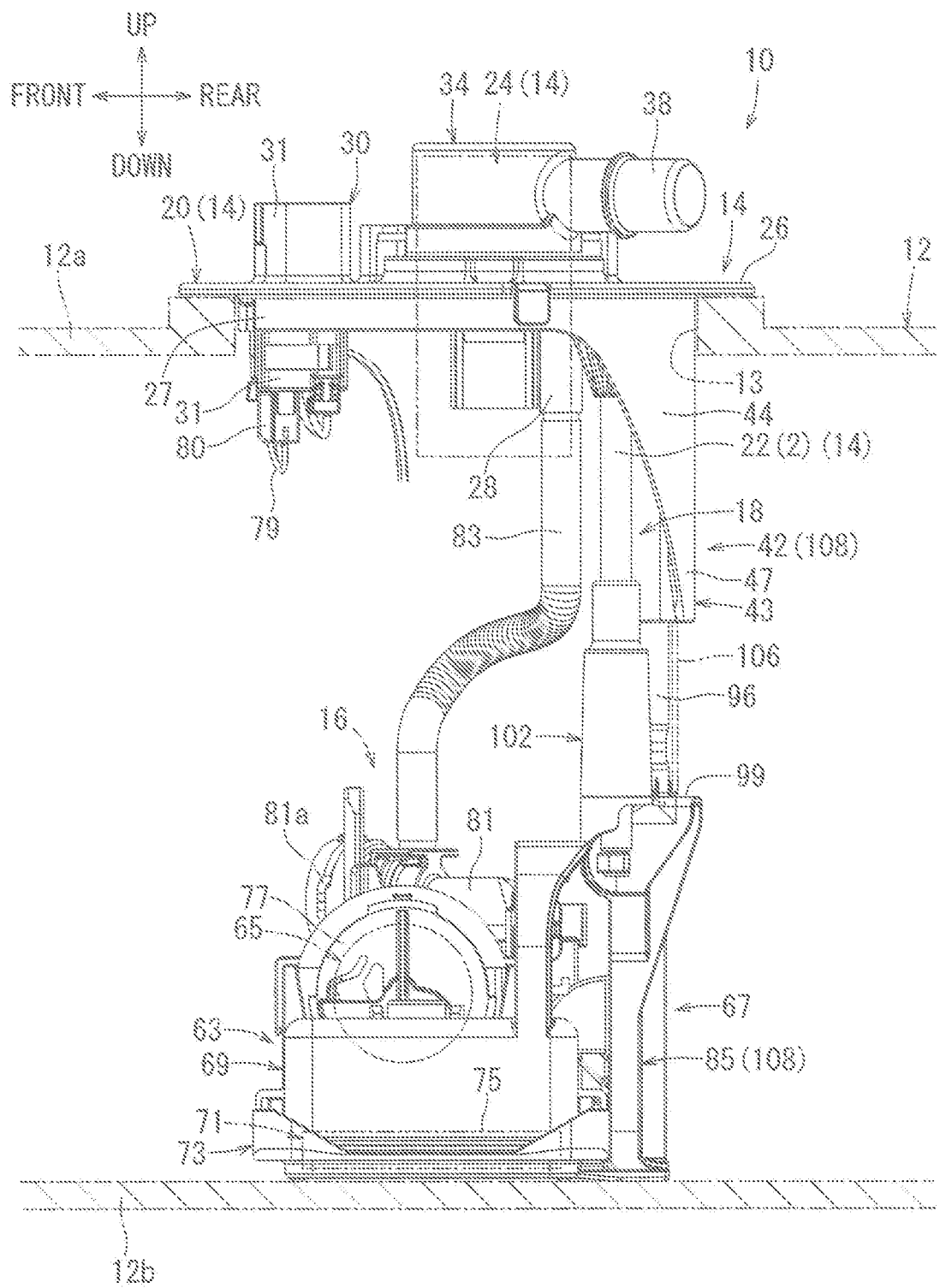
FIG. 3 is a right side view of the fuel supply device.

As shown in FIGS. 2 and 3, a fuel supply device 10 is installed into a fuel tank 12. The fuel tank 12 is made of resin and is configured as a hollow container having an upper wall 12*a* and a lower wall 12*b*. A circular hole opening 13 is formed in the upper wall 12*a*. The fuel tank 12 is mounted onto a vehicle (not shown) with the upper wall 12*a* and the bottom wall 12*b* oriented in a horizontal state (i.e. wherein the upper and lower wall remain parallel in the left-to-right direction). Liquid fuel such as, for example, gasoline is stored in the fuel tank 12. The fuel tank 12 may deform (expand or contract mainly in the vertical direction) in response to the variation of the internal pressure in the tank.

As shown in FIG. 3, the fuel supply device 10 may include a flange unit (cover-side unit) 14, a pump unit 16, and a connecting mechanism 18, among other components. The flange unit 14 includes a flange main body 20, two left and right connecting shafts 22(1) and 22(2), respectively, and a fuel vapor valve 24. The left connecting shaft 22 is denoted with reference numeral (1) and the right connecting shaft 22 is denoted with reference numeral (2) (i.e., the left connecting shaft is identified herein with reference numeral 22(1) and the right connecting shaft is identified herein with reference numeral 22(2)).

Figure 14:
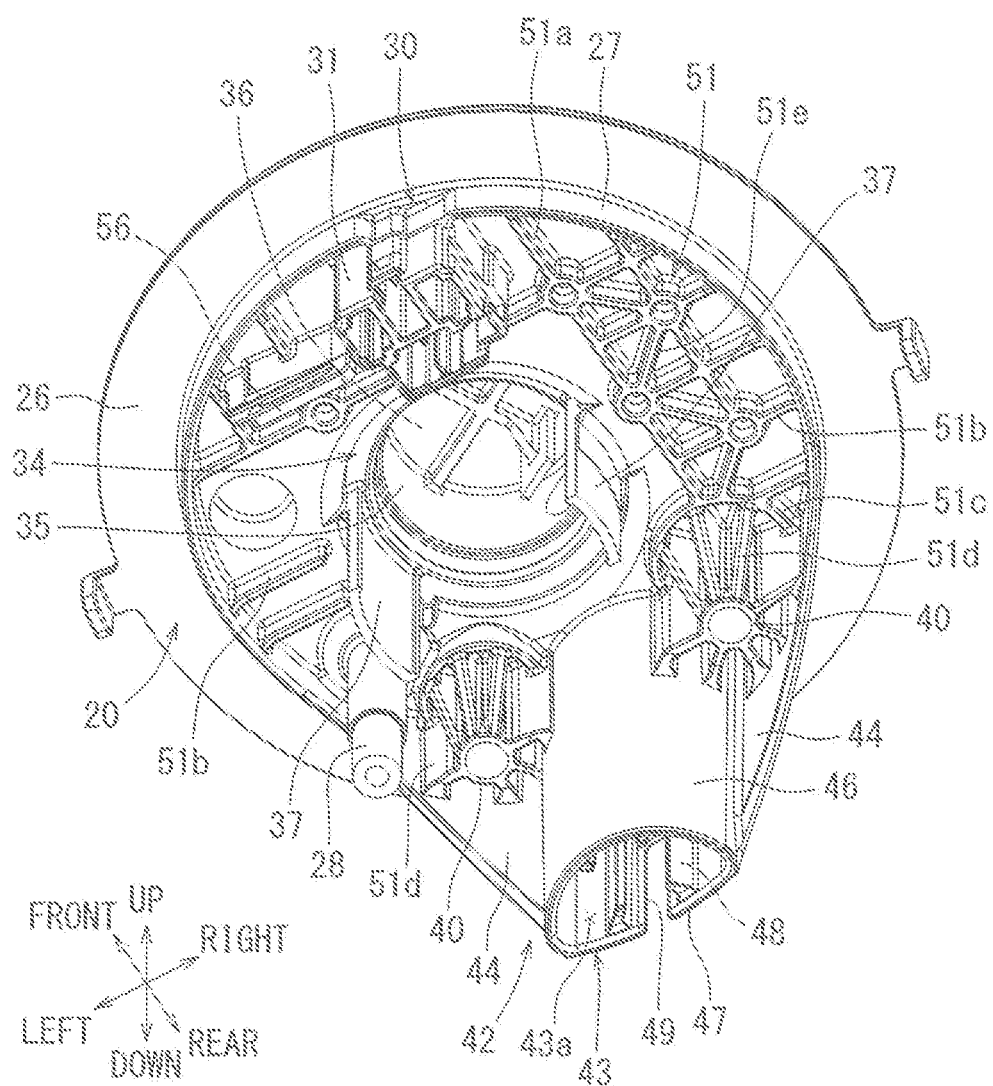
FIG. 14 is a perspective view showing a bottom of a flange main body.
Figure 15:
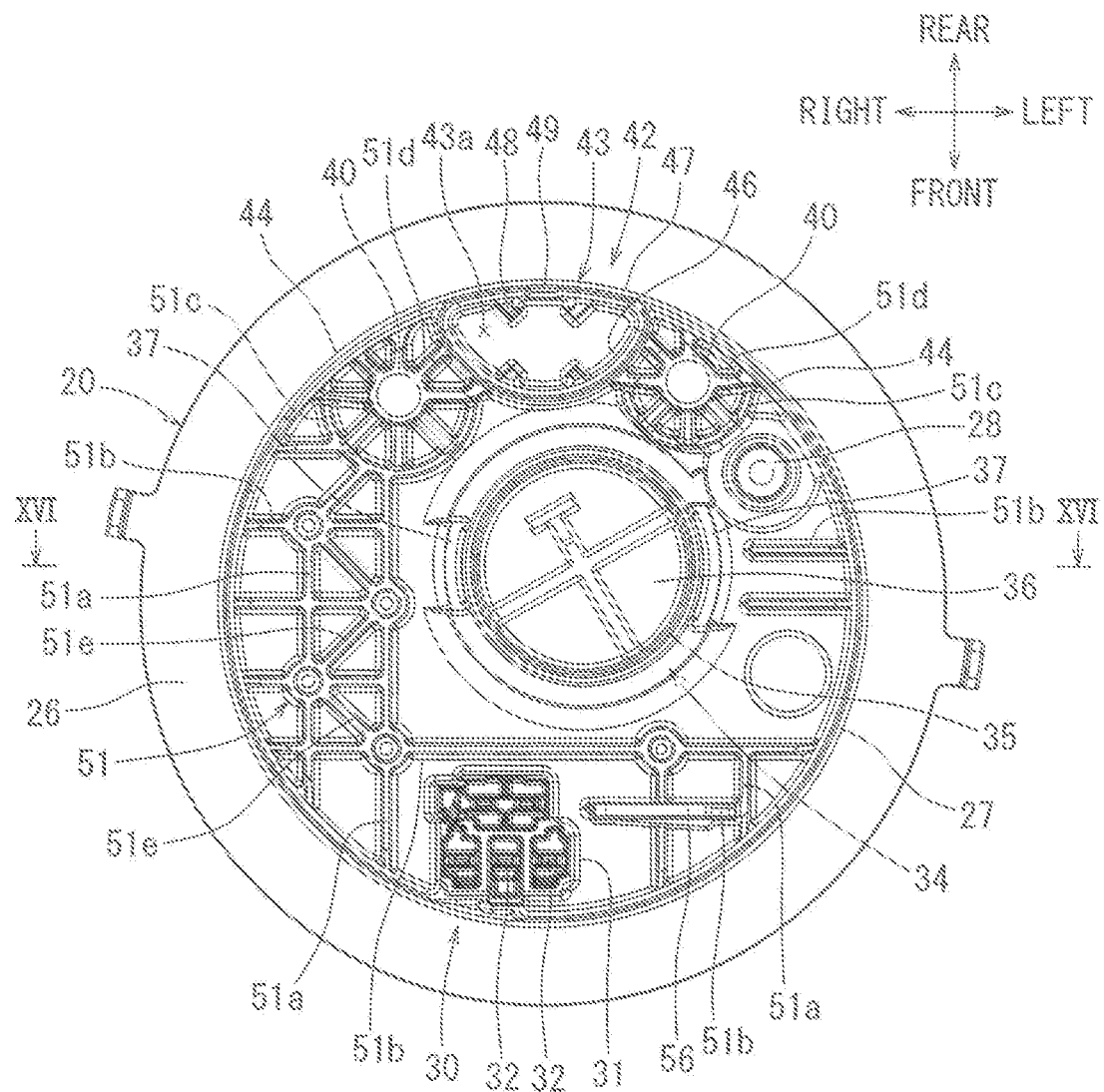
FIG. 15 is a bottom view of the flange main body.
Figure 16:
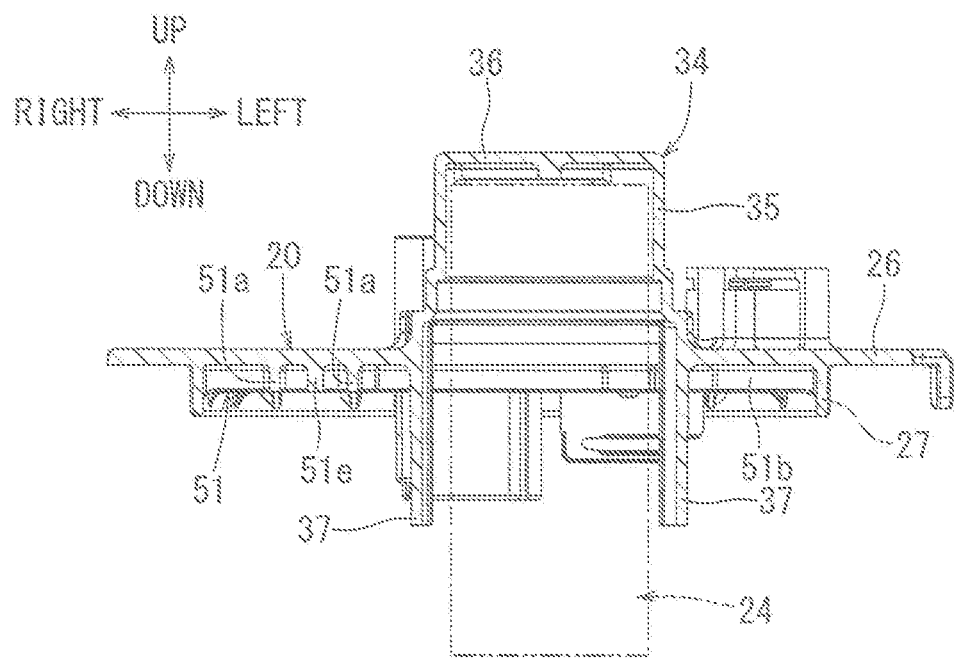
FIG. 16 is a cross-sectional view taken along line XVI-XVI in FIG. 15.

As shown in FIGS. 14 to 16, the flange main body (cover member) 20 is made of resin and is integrally formed by injection molding. The flange main body 20 comprises a circular disc-like cover plate 26, which is concentric with hole 13 when it is fit over hole 13, and comprises a larger surface area than the hole 13. A cylindrical fitting tubular portion 27 is concentrically formed, extending vertically downward along a circumferential perimeter radially inward and parallel to the circumferential periphery of the cover plate 26, and thus can fit within the hole 13 so as to plug it (see FIGS. 1-3). To this end, the fitting tubular portion 27 has an outer diameter slightly smaller than the outer diameter of the cover plate 26.

Figure 4:
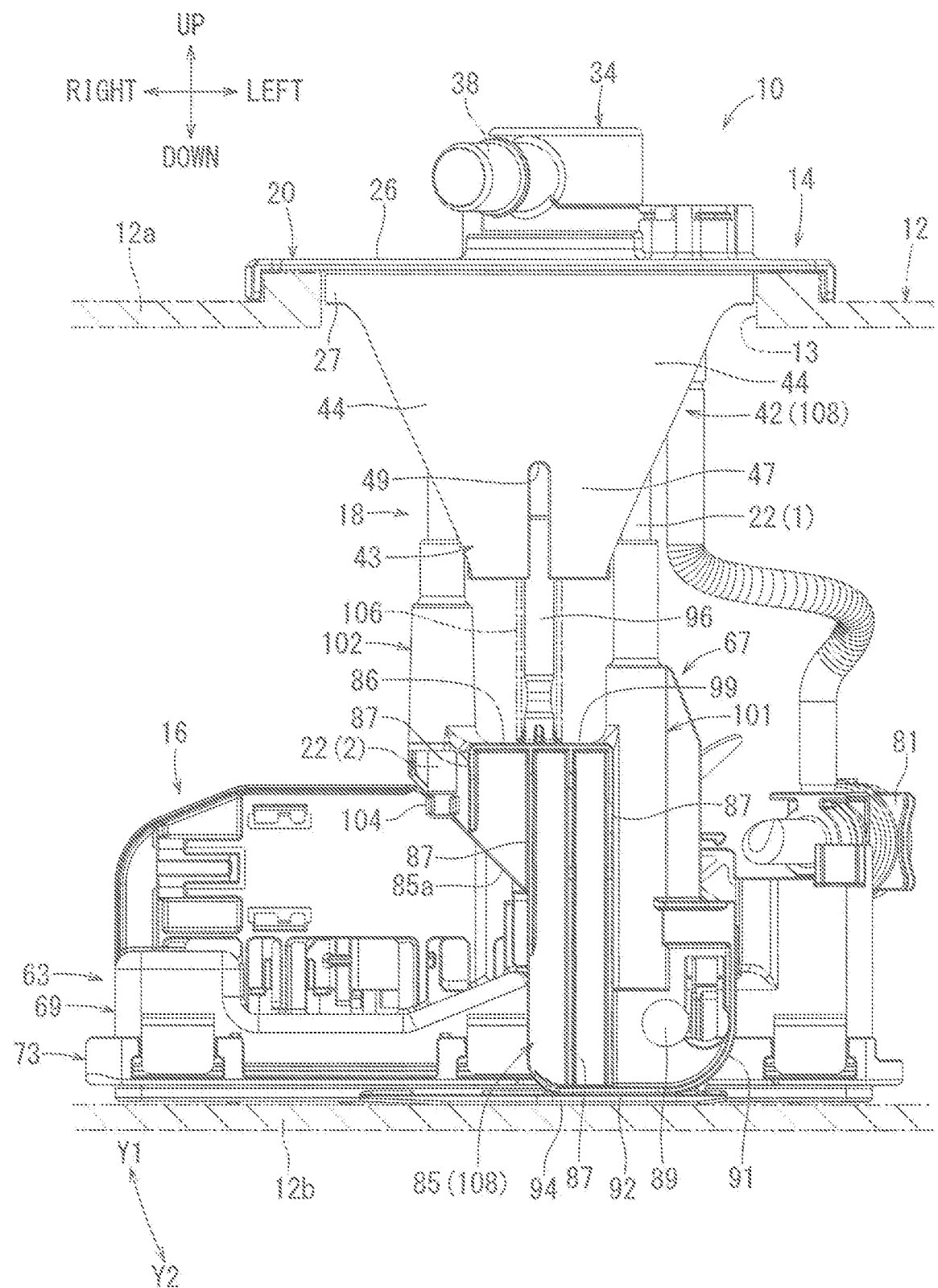
FIG. 4 is a rear view of the fuel supply device.
Figure 5:
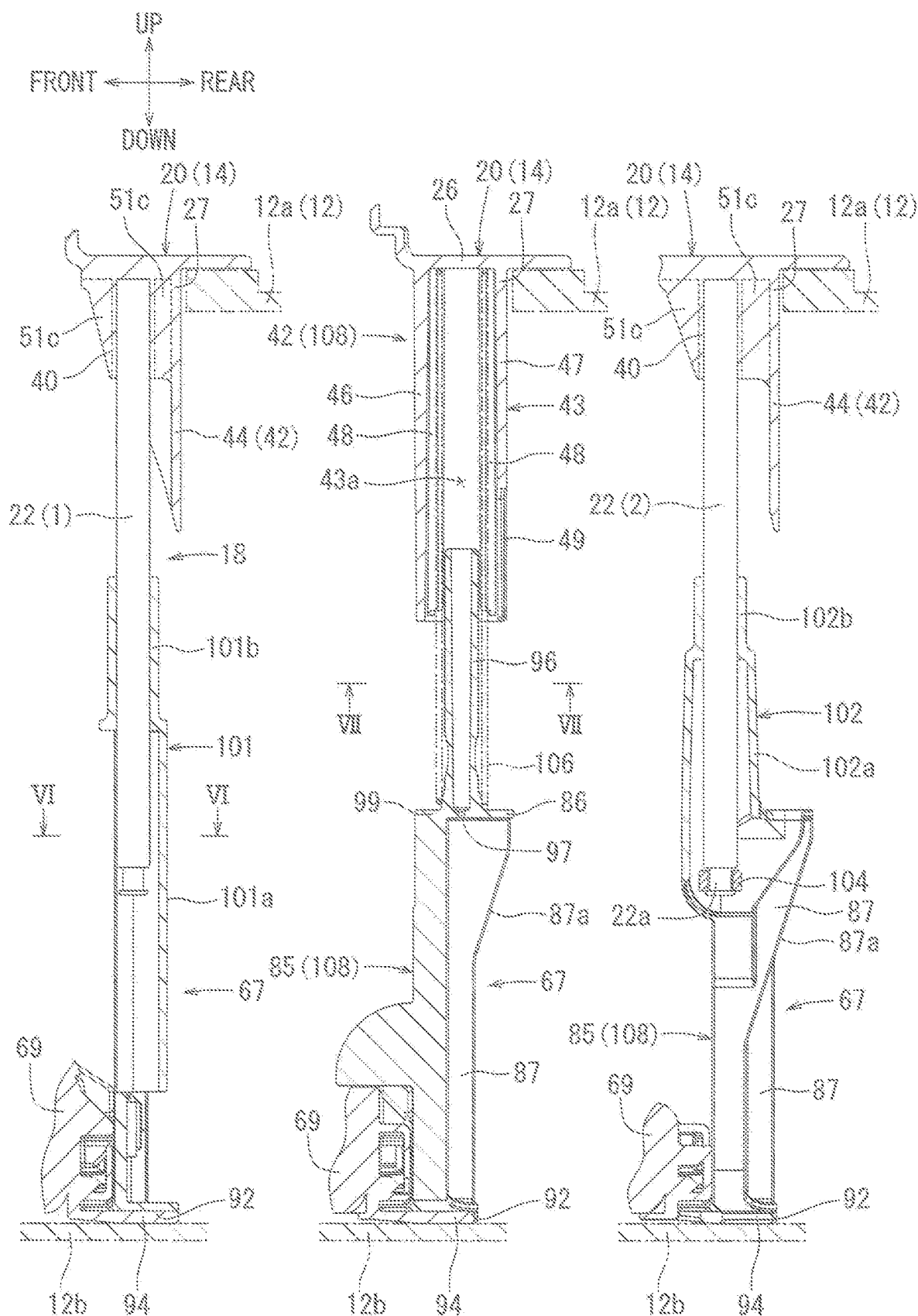
FIG. 5 is a descriptive view showing a relationship between both connecting shafts and an interval restricting means.

As shown in FIGS. 2 to 4, the cover plate 26 is attached to the upper wall 12*a* of the fuel tank 12 and fully surrounds and encloses the opening 13. The outer periphery of the cover plate 26 fits around the outer circumference of a circumferential peripheral edge surrounding the opening 13. Further, the fitting tubular portion 27 is fitted into and plugs the opening 13 of the fuel tank 12.

As shown in FIGS. 14 and 15, an outlet port 28 is formed on the cover plate 26. The outlet port 28 is in the form of a straight pipe protruding through both upper and lower surfaces of the cover plate 26. The outlet port 28 is disposed at the rear left portion of the fitting tubular portion 27 (obliquely upper right portion in FIG. 15).

An electrical connector 30 is formed on the cover plate 26. The electrical connector 30 includes upper and lower connector tubular portions 31 (see FIG. 3) protruding from both the upper and lower surfaces of the cover plate 26, as well as a plurality of terminals 32 (see FIG. 15) made of metal. The upper and lower connector tubular portions 31 are in the form of a rectangular cylinder extending from the both upper and lower surfaces of the cover plate 26. The terminals 32 are embedded in the cover plate 26 by insert molding and are disposed between both of the upper and lower connector tubular portions 31 (see FIG. 15). The electrical connector 30 is disposed at a frontward region of the circumferential edge (lower end portion in FIG. 15) of the fitting tubular portion 27, touching and adjacent to said edge.

Figure 1:
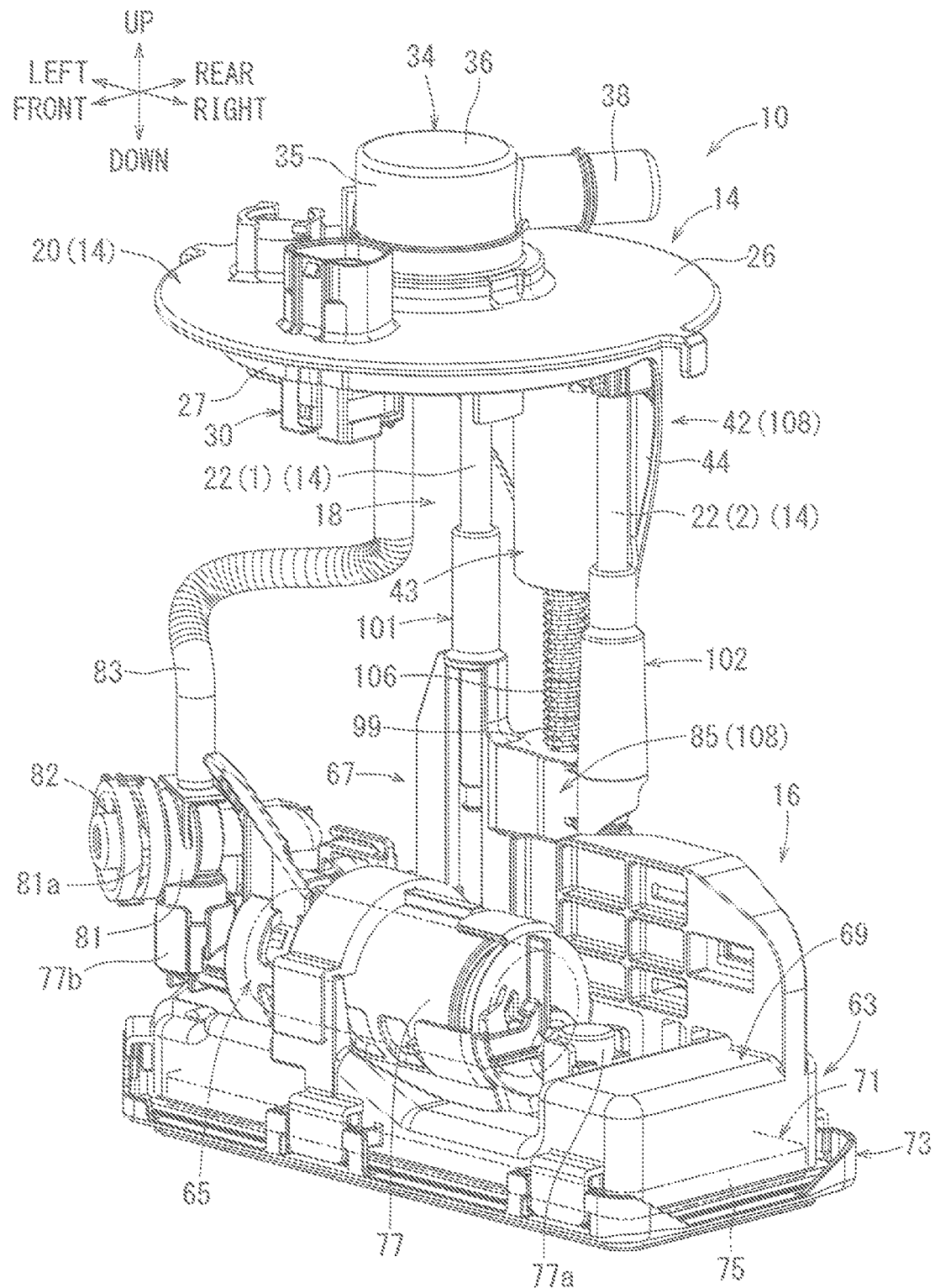
FIG. 1 is a perspective view of a fuel supply device according to one exemplary embodiment.

As shown in FIGS. 14 to 16, a valve accommodating portion 34 having a cylindrical shape with a top is formed in the radial central portion of the cover plate 26. The valve accommodating portion 34 includes a cylindrical accommodating tubular portion 35 as well as a top panel 36 which closes an upper opening of the accommodating tubular portion 35. The valve accommodating portion 34 also includes a pair of both left and right attachment pieces 37 projecting downward from the accommodating tubular portion 35. The lower end of the accommodating tubular portion 35, as well as the left and right downwardly projecting attachment pieces 37, are integrally constructed with the cover plate 26 as shown in FIG. 16. As shown in FIG. 1, an evaporation port 38 extending obliquely rearward to the right is formed at the upper end of the accommodating tubular portion 35.

As shown in FIG. 16, the valve accommodating portion 34 is formed to accommodate the upper portion of the fuel vapor valve 24, which fits into the valve accommodating portion 34. Both of the attachment pieces (attachment portions) 37 are formed on portion 34 so that the fuel vapor valve 24 can be attached by snap-fit engagement.

As shown in FIGS. 14 and 15, both a left and a right shaft attachment portion 40, each comprising a cylindrical shape with a top, are formed on the underside surface of the cover plate 26 spaced apart by a predetermined amount in the left-to-right direction. Both of the left and right shaft attachment portions 40 are arranged at the rear of the fitting tubular portion 27, at the rear left area and the rear right area of said portion, respectively.

As shown in FIG. 14, a stand-off portion 42 is formed on the underside surface of the cover plate 26. The stand-off portion 42 has a supporting tubular portion 43, as well as triangular left and right walls 44 adjacent to the left and right of said tubular portion 43. The supporting tubular portion 43 has a cylindrical shape with a top, and extends downward in the middle part of both shaft attachment portions 40 in the left-to-right direction. The supporting tubular portion 43 has a hollow interior section 43*a*. A leading end surface (lower end surface) of the supporting tubular portion 43 is formed in a plane orthogonal to the central vertical axis of the supporting tubular portion 43 in the up-to-down direction. The supporting tubular portion 43 has an ovular cross-sectional shape in the front-rear and left-right directional plane, and the longitudinal direction of the oval is oriented in the left-to-right direction. The supporting tubular portion 43 has a front wall 46 and a rear wall 47, where both walls 46, 47 comprise the ovular region periphery, fully encompassing interior region 43*a*.

As shown in FIG. 14, both of the triangular walls 44 are formed symmetrically with respect to each other about the up-to-down direction at the center of the rear wall 47 of the supporting tubular portion 43. Both of the triangular walls 44 are formed in the shape of a right-angled triangular plate, and their long edges are continuous with both left and right side edges of the rear wall 47, where the center of the rear wall 47 lies between the side edges. The upper edge of the front wall 46 of the supporting tubular portion 43 is integrally constructed to be continuous with the cover plate 26, and extends downward from said plate 26. The cumulative upper and circumferential edge of, collectively, the rear wall 47 of the supporting tubular portion 43 and the upper circumferential short edges of both triangular walls 44 in the outer peripheral circumferential direction continuously occupy approximately one third of the circumference of the outer circumferential periphery of the fitting tubular portion 27 (see FIG. 3 and FIG. 4). More specifically, both of the triangular walls 44 as well as the rear wall 47, collectively, are formed in a diagonally cut semi-cylindrical shape, as seen in FIG. 14, concentric with and having the same radius of curvature as that of the fitting tubular portion 27. The stand-off portion 42 extends downwardly from the flange main body 20 as seen from a rear view (see FIG. 4) while its width is tapered and narrows as it extends further downward.

Figure 7:
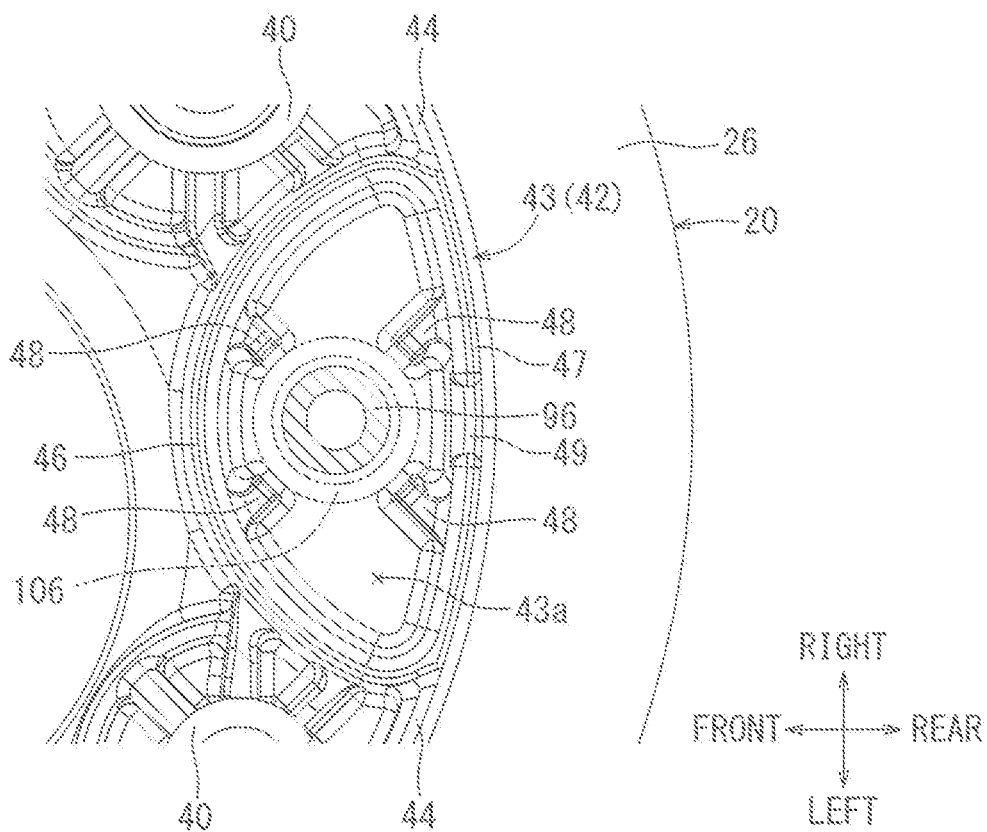
FIG. 7 is a cross-sectional view taken along line VII-VII in FIG. 5.
Figure 10:
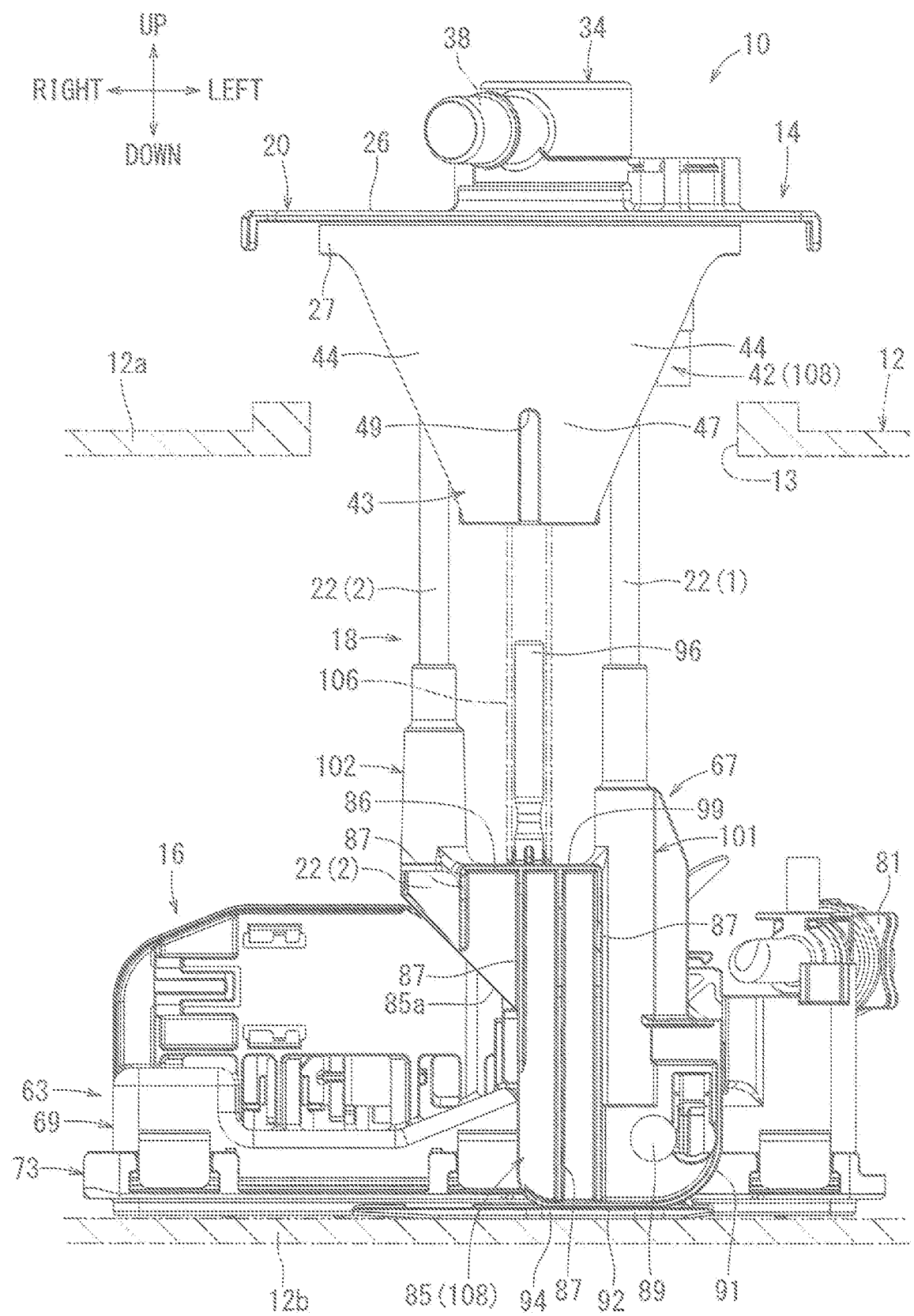
FIG. 10 is a rear view of the fuel supply device in course of installation to the fuel tank.

As shown in FIG. 7, the surface along the inner peripheral radial perimeter of the supporting tubular portion 43 is formed with a plurality (for example, four) of guide ribs 48 extending radially inward toward the central region of the ovular supporting tubular portion 43 in the front-rear left-right cross-sectional plane. The guide ribs 48 are arranged at equally spaced intervals in the circumferential direction about the center of the ovular supporting tubular portion 43 in the front-rear left-right cross sectional plane, for example, with an interval occurring at every 90 degrees, and are formed to extend in a straight line, vertically extending in the axial up-to-down direction of the supporting tubular portion 43 (see the middle drawing of FIG. 5). The leading ends in the projecting direction of the guide ribs 48 (i.e. the radially inward-most ends of the guide ribs 48) are arranged on a circle around the central axis of the supporting tubular portion 43. As shown in FIGS. 4 and 10, a slit groove 49 is formed at the lower portion of the rear wall 47 of the supporting tubular portion 43. The slit groove 49 extends linearly in the vertical direction in the up-down direction perpendicular to the front-rear and left-right directional plane, and is formed in a split groove shape wherein the lower end surface of the rear wall 47 has a spaced-apart gap at its center (in the left-right direction).

As shown in FIGS. 15 and 16, ribs 51 collectively form a grid-like shape on the underside surface of the cover plate 26 in the remaining area of the plate aside from the area collectively occupied by the outlet port 28, the connector tubular portion 31 of the electrical connector 30, the accommodating tubular portion 35 of the valve accommodating portion 34, both of the shaft attachment portions 40 and the front wall 46 of the supporting tubular portion 43 of the stand-off portion 42. The ribs 51 have a plurality of vertical rib sections 51a, lateral rib sections 51b, annular rib sections 51c, radial rib sections 51d and inclined rib sections 51e, respectively. The vertical rib sections 51a are formed in a straight line extending in the front-to-rear direction. The lateral rib sections 51b are formed in a straight line extending in the left-to-right direction. The annular rib sections 51c each form a semi-annular shape surrounding and concentric with the shaft attachment portions 40. One semicircular end of each annular rib sections 51c in the front-rear left-right cross-sectional plane is continuous and in touching contact with the fitting tubular portion 27, and the other semicircular end is continuous and in touching contact with the front wall 46. The radial rib sections 51d are formed radially between the shaft attachment portions 40 and, collectively, the annular portions defined by the fitting tubular portion 27 (the portion of 27 coincident with the triangular walls 44, as well as walls 44 themselves), the front wall 46, as well as the annular rib sections 51c.

First radial rib sections 51d are formed between the shaft attachment portions 40 and the front wall 46, as well as between the shaft attachment portions 40 and the fitting tubular portion 27 including the triangular walls 44. The first radial rib sections 51d are formed in rectangular plate shapes that extend in the axial up-down direction and radial direction, wherein the radial direction is about the radial center of the supporting tubular portion 43 (corresponding to the radial rib sections 51d formed at the front wall 46 of portion 43), or about the radial center of fitting tubular portion 27, respectively. Second radial rib sections 51d are formed between the shaft attachment portions 40 and the annular rib sections 51c. The second radial rib sections 51d respectively form triangular plate shapes that extend along the axial up-down direction and the radial direction, wherein the radial direction is about the radial center of the annular ribs 50c, where the hypotenuse of the triangle (of the triangular plate shape of the second radial rib sections 51d) extends from the lower edge outer circumference of the shaft attachment portion 40 to a point on the upper inner circumferential periphery of annular rib section 51c (see FIG. 14). Inclined rib sections 51e are linearly formed so as to diagonally connect the intersections between the vertical rib sections 51a and the lateral rib sections 51b in the front-rear left-right directional plane. A hook 56 is formed at the lateral rib section 51b (positioned, for example, in a left area) adjacent to the electrical connector 30.

The ribs 51 are formed in a non-contiguous manner with both the connector tubular portion 31 of the electrical connector 30 and the accommodating tubular portion 35 of the valve accommodating portion 34. In other words, the vertical rib sections 51a and the lateral rib sections 51b in the vicinity of the connector tubular portion (tubular portion) 31 are formed in a non-contiguous manner with the connector tubular portion 31. The vertical rib sections 51a, lateral rib sections 51b and the annular rib sections 51c in the vicinity of the accommodating tubular portion (tubular portion) 35 are formed in a non-contiguous manner with the accommodating tubular portion 35.

Figure 17:
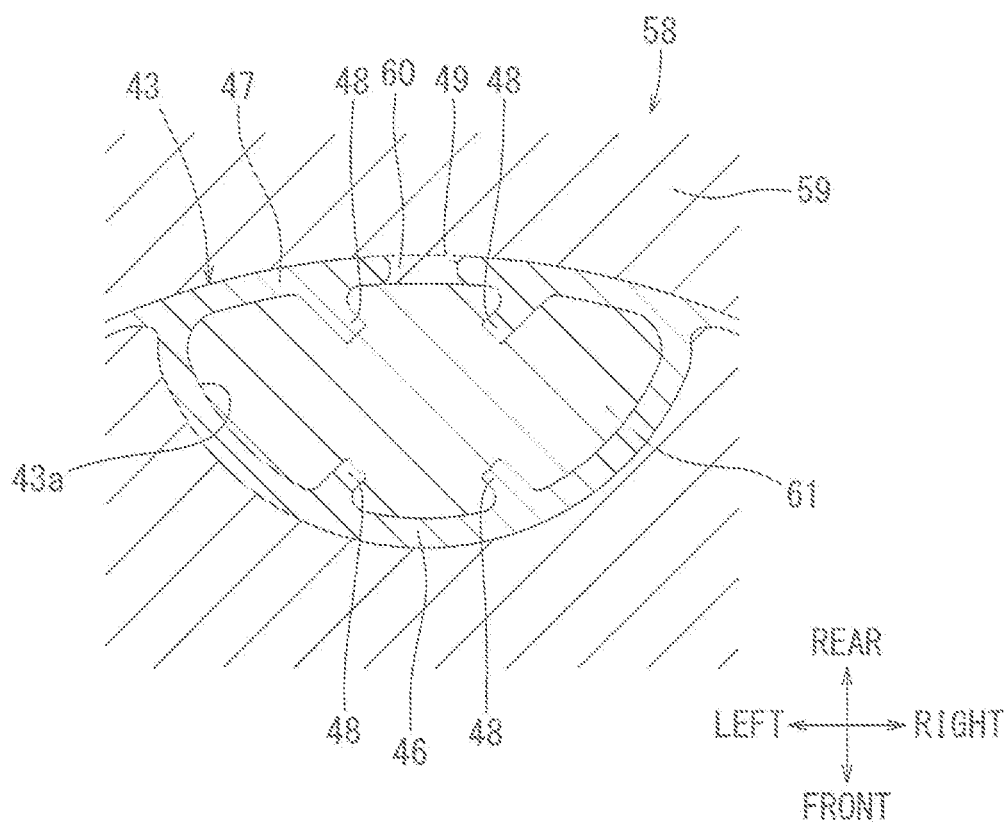
FIG. 17 is a cross-sectional view of a die utilized for molding a support tubular portion.

Hereinafter, a die for molding the supporting tubular portion 43 of the flange main body 20 will be described. As shown in FIG. 17, the die 58 includes an outer die 59 for molding an outer surface of the both walls 46 and 47 of the supporting tubular portion 43 and a hollow section die 61 for molding a hollow section 43a of the supporting tubular portion 43. The outer die 59 includes a slit groove mold part 60 at its lower end in the up-down direction for molding the slit groove 49 of the supporting tubular portion 43. A front end surface of the slit groove mold part 60 in the protruding direction (lower direction in FIG. 17 corresponding to the front direction of the labelled legend) contacts the outer peripheral surface of the hollow section die 61 where the two surfaces face oppositely in the rear-to-front direction. A cooling passage through which coolant such as water or air flows is defined in the hollow section die 61, if necessary. The outer die 59 may be formed of a plurality of dies. The outer die 59 may be formed of a plurality of dies. The slit groove mold part 60 may be formed as part of the hollow section die 61 instead of the outer die 59.

Hereinafter, the connecting shaft 22 will be described. As shown in the left-most and right-most drawing of FIG. 5, the connecting shafts 22 are made of rods or hollow pipes, which may be made of metal, and the like. One end (upper end) of each connecting shafts 22 is connected to a respective shaft attachment portion 40 of the flange main body 20 in a press-fitting configuration. Consequently, both left and right connecting shafts 22(1) and 22(2), respectively, extend downwardly from the flange main body 20 and are positioned parallel to each other.

Hereinafter, the fuel vapor valve (component, valve device) 24 will be described. As shown in FIG. 16, the outer contour of the fuel vapor valve 24 has a cylindrical, columnar shape. The upper portion of the fuel vapor valve 24 is fitted and accommodated within the valve accommodating portion 34 of the flange main body 20. Accordingly, the fuel vapor valve 24 is fixedly attached to the attachment pieces 37 of the valve accommodation portion 34 by snap-fit engagement. An integrated valve including, for example, a fuel vapor control valve and a full-tank regulating valve may be used as the fuel vapor valve 24. The fuel vapor control valve closes when the internal pressure within the fuel tank 12 is lower than a predetermined value and opens when the internal pressure is greater than the predetermined value. The full-tank regulating valve opens only when the fuel tank 12 is not fully filled with fuel, and the valve remains closed when the fuel tank 12 is fully filled with the fuel.

Hereinafter, the pump unit 16 will be described. As shown in FIG. 2 and FIG. 3, the pump unit 16 is placed flush against the bottom wall 12b within the fuel tank 12 in a horizontal state (laterally placed state) in which its height in the vertical direction is at its minimum (zero incline). The pump unit 16 includes a sub-tank 63, a fuel pump 65 and a joint member 67.

The sub-tank 63 includes a tank main body 69, a fuel filter 71 and a bottom cover 73. The tank main body 69 is made of resin and formed in an upside-down shallow box shape where the lower basal surface of said shape is opened. The tank main body 69 is formed in an elongated rectangular shape wherein which its longitudinal direction is left-to-right direction as seen from a plan view. An opening is formed in the upper wall of the tank main body 69 for introducing fuel from within the fuel tank 12 into the sub-tank 63.

The fuel filter 71 includes a filter member 75. The filter member 75 is made of resin non-woven fabric or the like, and is formed in an elongated rectangular prismatic shape wherein its longitudinal direction is in the left-to-right direction as seen from a plan view, and is formed as a flat shape with its vertical length being the shortest, and forming the thickness direction of the rectangular prismatic shape. The filter member 75 is disposed so as to close the opening of the lower basal surface of the tank main body 69. An upper surface of the filter member 75 faces the internal space of the tank main body 69. Consequently, a fuel reservoir space is defined within the sub-tank 63 by the tank main body 69 and the filter member 75 (within the upper and lower boundaries of the filter member 75). Therefore, the fuel introduced into the sub-tank 63 (i.e., the fuel reservoir space from the opening in the upper wall of the tank main body 69) can be stored within the fuel reservoir space.

Although not shown, an inner skeleton member made of resin is built in the fuel filter 75 that serves to maintain the fuel filter member 75 in an expanded state. A connection pipe made of resin is provided through the upper surface of the fuel filter member 75 allowing communication of the interior of the fuel reservoir space with the outside of the filter member 75 exterior to said space. The connection pipe and the inner skeleton member are coupled to each other in a snap-fit configuration or the like. The connection pipe is disposed within the opening hole formed in the upper surface of the tank main body 69.

As shown in FIGS. 1 and 2, the bottom cover 73 is made of resin and is formed in a lattice plate configuration through which the fuel can flow, even when the cover 73 is flush against the bottom floor 12b of the fuel tank 12. The bottom cover 73 is joined to the tank main body 69 by snap-fit engagement or the like. A peripheral edge around the filter member 75 is clamped and held between the outer periphery of the tank main body 69 and the outer periphery of the bottom cover 73, as seen from a plan view. Therefore, even when the bottom cover 73 contacts with the bottom wall 12b of the fuel tank 12, the fuel within the fuel tank 12 can be sucked into the filter member 75 from the bottom of the filter member 75 through the lattice openings of the bottom cover 73.

The fuel pump 65 is an electric fuel pump configured to pump fuel in and out of the fuel tank 12. The outer contour of the fuel pump 65 has a substantially columnar, cylindrical shape extending longitudinally in the left-to-right direction. The fuel pump 65 is accommodated in the pump casing 77 made of resin. The pump casing 77 is coupled to the tank main body 69 of the sub-tank 63 in a snap-fit configuration or the like. Therefore, the fuel pump 65 is disposed on the sub-tank 63 in a horizontal state i.e., in the laterally placed state in which the axial direction of the fuel pump 65 is oriented in the left-to-right direction.

The fuel pump 65 includes a connection connector 80 that is electrically connected via a flexible wirings 79. The connection connector 80 is connected to a lower connector tubular portion 31 of the electrical connector 30 on the flange main body 20 of the flange unit 14. Therefore, the power fed from the power source is supplied to the fuel pump 65 from the electrical connector 30 through the wirings 79 of the connection connector 80. The wirings 79 are hooked to the hook portion 56 of the flange main body 20 (see FIG. 2).

As shown in FIG. 1, a suction pipe portion 77a is formed at the right end of the pump casing 77. The suction pipe portion 77a is connected to the previously described connection pipe of the fuel filter 71. The suction pipe portion 77a is connected to a fuel suction inlet (not shown) that is provided at one end (right end) of the fuel pump 65 in the left-right longitudinal axial direction of said pump 65. Therefore, after the fuel is filtered by the filter member 75, through the suction pipe portion 77a and said fuel suction inlet, the fuel is drawn into the fuel pump 65. More specifically, the filter member 75 filters fuel within the fuel tank 12 wherein the fuel is drawn from the lower basal side of the filter member 75 into the fuel pump 65. Filter member 75 also filters fuel wherein the fuel is drawn from within the sub tank 63, to the upper side of the filter member 75, and eventually into the fuel pump 65. Because the filter member 75 is elongated in the left-to-right direction, the filtering area as a whole can be increased so that even when the upper level of the fuel within the fuel tank 12 is inclined when the vehicle drives on a curve, the fuel may remain in the fuel member 75 so that the fuel pump 65 is prevented from sucking air and running dry.

An outlet pipe portion 77b is formed at the left end of the pump casing 77. The outlet pipe portion 77b is connected to a fuel outlet (not shown) provided at the opposite left axial end (left end) along the longitudinal left-to-right axis of the fuel pump 65. A case 81 for a pressure regulator is coupled to the outlet pipe portion 77b by snap-fit engagement or the like. The pressure regulator 82 is fitted into the case 81 while an anti-removal member 81a for preventing the removal of the pressure regulator 82 is attached to the case 81 by utilizing the elastic deformation thereof. The pressure regulator 82 serves to adjust the pressure of the fuel outlet by the pump 65 in the case 81 and discharges surplus fuel back into the fuel tank 12. The case 81 for the pressure regulator is connected to the outlet port 28 at the flange main body 20 of the flange unit 14 through a flexible piping member 83 made of, for example, a bellows hose (see FIG. 2).

As shown in FIG. 4, the joint member 67 is made of resin, in an integrally constructed piece which may be integrally formed by injection molding. The joint member 67 mainly includes a connecting plate 85 that may be a vertically elongated strip plate, having a narrower width in the left-to-right direction than the up-to-down direction, and is flat in the front-to-rear direction. The connecting plate 85 is formed as an upside-down L-shape with a notched recess 85a at its lower right portion (lower left portion in FIG. 4). The upper end of the connecting plate 85 is formed with a projecting plate 86 that is configured as a horizontal plate and extends in the rearward direction (see the middle figure in FIG. 5). The front-to-rear directional width of the upper surface of the connecting plate 85 is widened by projecting plate 86, such that it corresponds to the front-to-rear directional width of the supporting tubular portion 43 of the stand-off portion 42 at the flange main body 20 of the flange unit 14.

A plurality of (for example, four) projecting strip portions 87, which linearly extend downward from the projecting plate 86, projecting rearwards from the rear surface of the connecting plate 85, as shown in the right-most and middle drawings of FIG. 5, as well as FIG. 4. The projecting width in the front-to-rear direction at the upper end of the projecting strip portions 87 with respect to the rear surface of the connecting plate 85 is determined to be the same or substantially the same as the projecting width of the projecting plate 86 in the front-to-rear direction. The projecting widths at the lower portions of the two projecting strip portions 87 on the left side (right side in FIG. 4) are determined to be approximately half of the projecting width of the projecting plate 86 (see the middle drawing of FIG. 5) in the front-to-rear direction. The inclined edges 87a define the rear ends of these two projecting strip portions 87 on the left side (right side in FIG. 4) wherein the inclined edges 87a are tapered and narrow down from their rearmost extent corresponding to the rearmost end of projecting plate 86, to their shortest length in the rear direction, corresponding to half of the projecting width of the projecting plate 86. Further, inclined edges 87a (allocated the same reference numeral) also define the other two projecting strip portions 87 on the right side (left side in FIG. 4), wherein said inclined edges 87a are parallel to the inclined edges 87a of the two projecting strip portions 87 on the left side (right side in FIG. 4) and the lower ends of said inclined edges 87a are continuous with the rear end of the flat connecting plate 85, wherein said inclined edges 87a are tapered and narrow down from their rearmost extend corresponding to the rearmost end of projecting plate 86, to their shortest length in the rear direction, corresponding to the rear end of the flat plate 85 below the projecting plate 86, wherein the rear end of the flat plate 85 and the inclined edge 87a is coincident for a portion of the length of the flat plate 85 in the up-to-down direction (see right-most figure in FIG. 5).

As shown in FIG. 4, a lower end of the connecting plate 85 is rotatably connected to the rear side of the tank main body 69 for the sub-tank 63 by a support shaft 89 extending in the front-to-rear direction. In this way, the sub-tank 63 for the pump unit 16 is rotatably connected to the joint member 67 in the vertical direction (see directions indicated by arrows Y1 and Y2 in FIG. 4).

An arcuate surface 91, partially forming a circular arc wherein the arc is concentric with the support shaft 89, with a shared radial center between the two, is formed at a corner defined by the lower surface and the left surface (right surface in FIG. 4, but depicted as left, according to the legend in the figure) of the connecting plate 85. An anti-rotation surface 92 is formed at the lower surface of the right portion (left portion in FIG. 4) of the connecting plate 85 wherein the anti-rotation surface 92 is defined as a flat surface continuous with the arcuate surface 91. A planar anti-rotation portion 94 is defined in the center (in the right-to-left direction) of the rear surface of the bottom cover 73 of the sub-tank 63. The anti-rotation portion 94 abuts the bottom wall 12b of the fuel tank 12 in a face to face surface contacting manner, flush against the bottom of fuel tank 12. The anti-rotation portion 94 may abut the anti-rotation surface 92 of the connecting plate 85 when the sub-tank 63 is in a horizontal state flush against the bottom of the fuel tank 12. This configuration, since the provided anti-rotational surfaces increase the friction between the sub-tank 63 and the joint member 67, and the bottom wall 12b of the fuel tank 12, respectively may restrict the sub-tank 63 from rotating from the horizontal state in such direction that the right end (left end in FIG. 4) of the sub-tank 63 inclines upward and obliquely ascends from the horizontal state. This described, Y1 rotation-inhibited state corresponds to the horizontal state of the pump unit 16. In contrast, since the arcuate surface 91 is defined on the connecting plate 85, the counterclockwise rotation of the sub-tank 63 about the shaft 89 from the horizontal state in such direction that the right end (left end in FIG. 4) inclines downward (direction indicated by the arrow Y2 in FIG. 4) due to its own weight is allowed when the sub-tank 63 is suspended from the joint member 67.

A vertical guide pillar 96 is formed in the center in the left-to-right direction of the connection plate portion 85 including the projecting plate 86. As shown in the middle figure in FIG. 5, the guide pillar 96 is disposed so as to be concentric with the supporting tubular portion 43 of the stand-off portion 42 on the flange unit 14, as seen in the middle drawing of FIG. 5. The outer peripheral portion of the connecting plate 85 (including the projecting plate 86) at the bottom of the guide pillar 96 facing the inner peripheral portion of supporting tubular portion 43 in the vertical up-to-down direction constitutes a stopper portion 99, which restricts further movement of the pillar 96 into the interior of 43 due to the projecting plate 86 projecting outward to a greater degree than pillar 96 in the front-to-rear direction, halting movement of connection plate 85 into the interior of the supporting tubular portion 43.

The guide pillar 96 is formed in a hollow cylindrical configuration. A through hole 97 is formed in the projecting plate 86 comprising the stopper portion 99 and bottom surface of guide pillar 96, wherein said through hole 97 passes through the bottom surface of the guide pillar 96. As a result, the fuel is not subjected to stay in the guide pillar 96, and flows downwardly through the through hole 97 to be discharged.

Hereinafter, the coupling mechanism 18 will be described. As shown in FIG. 2, the connecting mechanism 18 is a mechanism configured to movably connect the pump unit (pump-side unit) 16 in the vertical direction to the flange main body 20 of the flange unit 14. The connecting mechanism 18 comprises both of the connecting shafts 22(1) and 22(2) provided at the flange main body 20 of the flange unit 14 as well as the joint member (joint portion) 67 provided at the pump unit 16.

Figure 6:
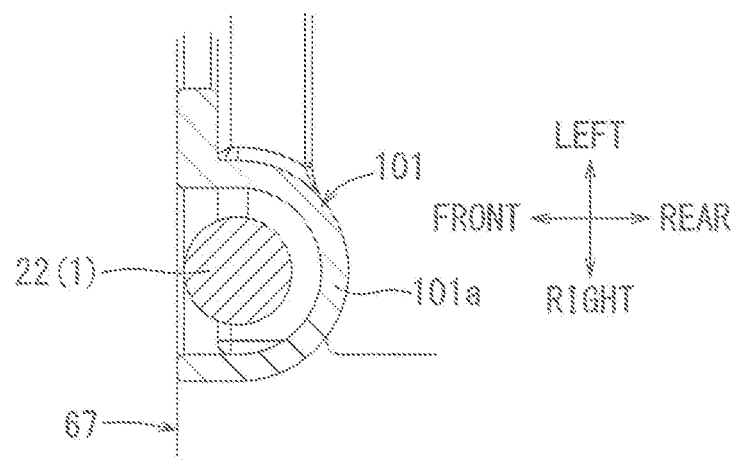
FIG. 6 is a cross-sectional view taken along line VI-VI in FIG. 5.

A left connector tubular portion (hereinafter referred to as a "first connector tubular portion") 101 and a right connector tubular portion (hereinafter referred to as a "second connector tubular portion") 102, both with hollow interiors, are formed on both left and right sides of the joint member 67, and extend downward from the left connecting shaft 22(1) and right connecting shaft 22(2), respectively, such that the tubular portions are parallel to each other. The hollow sections within the both connector tubular portions 101 and 102 correspond to shaft insertion holes. As shown in the left drawing of FIG. 5, the first connector tubular portion 101 includes a large diameter tubular portion 101a extending in the vertical direction and small diameter tubular portion 101b also extending in the vertical direction above the large tubular portion 101a and extending continuously upwards from the top of 101a, wherein the portions 101a and 101b are concentric with each other, and share the same radial center. The large diameter tubular portion 101a has a semi-cylindrical shape, forming a bottom semicircle shape open towards the front portion in the front-rear left-right directional plane (see FIG. 6). A lower end of the large diameter tubular portion 101a is disposed at a position lower than the stopper portion 99 (see the middle drawing of FIG. 5, wherein the lower end of large diameter tubular portion 101a in the left drawing of FIG. 5 is at a lower point, where the depictions of the sub-drawings of FIG. 5 are comparable height-wise) of the joint member 67 and opened. An upper end of the large diameter tubular portion 101a i.e., a lower end of the smaller tubular portion 101b is disposed at a position higher than the stopper portion 99 (see the middle drawing of FIG. 5) of the joint member 67. The small diameter tubular portion 101b is formed to have a smaller inner diameter than the inner diameter of the large diameter tubular portion 101a. The first connector tubular portion 101 is disposed to be concentric with the left connecting shaft (hereinafter, referred to as a "first connecting shaft") 22(1). The first connecting shaft 22(1) is movably or slidably inserted into the first connector tubular portion 101 in an axial direction (vertical direction), wherein the outer diameter of the left connecting shaft 22(1) approximately corresponds to the inner peripheral diameter of 101b as shown in the left drawing of FIG. 5.

As shown in the right drawing of FIG. 5, the second connector tubular portion 102 includes a large diameter tubular portion 102a extending in the vertical direction and a small diameter tubular portion 102b also extending in the vertical direction above the large diameter tubular portion 102a and extending continuously upwards from the top of the large diameter tubular portion 102a, wherein the large diameter and small diameter tubular portions 102a and 102b, respectively, are concentric with each other, and share the same radial center. A lower end of the large diameter tubular portion 102a is disposed at a position higher than the lower end of the large diameter tubular portion 101a (see the right-most and left-most drawings of FIG. 5) of the first connector tubular portion 101 but lower than the stopper portion 99 (see the middle figure in FIG. 5) of the joint member 67 and is opened at its rear. An upper end of the large diameter tubular portion 102a i.e., a lower end of the small diameter tubular portion 102b, is disposed at a position higher than the lower end of the smaller diameter tubular portion 101b (see the left-most drawing of FIG. 5) of the first connector tubular portion 101. An upper end of the smaller diameter tubular portion 102b is disposed in a position at the same level as the upper end of the small diameter tubular portion 101b (see the left-most and right-most drawings of FIG. 5) of the first connector tubular portion 101. The small diameter tubular portion 102b has the same inner diameter as the inner diameter of the small diameter tubular portion 101b (see the left-most and right-most drawings of FIG. 5) of the first connector tubular portion 101. The second connector tubular portion 102 is concentrically arranged with respect to the right connecting shaft (hereinafter, referred to as a "second connecting shaft") 22(2), and both components share the same radial center. The second connecting shaft 22(2) is movably or slidably inserted into the second connector tubular portion 102 in the axial direction (vertical direction), wherein the outer diameter of the right connecting shaft 22(2) approximately corresponds to the inner peripheral diameter of 102b as shown in the right-most drawing of FIG. 5.

A shaft anti-removal member 104 formed in a C-ring shape, made of resin, is attached to a small diameter axis portion (denoted with the reference numeral 22a) at the lower end of the second connecting shaft 22(2), wherein said small diameter axis portion is located at the lower terminal end of right connecting shaft 22(2) and has a smaller diameter than the rest of the shaft (see right-most drawing of FIG. 5). The small diameter axis portion of second connecting shaft 22(2) is attached to the small diameter axis portion by utilizing elastic deformation. The outer peripheral diameter of the shaft anti-removal member 104 is smaller than the inner peripheral diameter of the large diameter tubular portion 102a of the second connector tubular portion 102, but is larger than the inner peripheral diameter of the small diameter tubular portion 102b of its connector tubular portion 102. As a result, the shaft anti-removal member 104 comes in contact with the lower end surface of the small diameter tubular portion 102b when the joint member 67 of the pump unit 16 is suspended from the flange main body 20 of the flange unit 14, and small diameter tubular portion 102b slides downward along right connecting shaft 22(2), eventually hitting anti-removal member 104 at its lower end. In this way, the joint member 67 is prevented from being removed from the second connecting shaft 22(2).

As shown in the middle drawing of FIG. 5, a lower part of a spring 106 such as a metal coil spring is fitted to coil around and fully encompass the guide pillar 96. The lower end of the spring 106 abuts the stopper portion 99 of the joint member 67. The upper portion of the spring 106 is inserted or fitted into the inner circumferential periphery of the supporting tubular portion 43 of the stand-off portion 42 of the flange main body 20 (see FIG. 7). An upper end of the spring 106 abuts a top surface of the supporting tubular portion 43, adjacent to cover plate 26. Consequently, the spring 106 is interposed between the flange main body 20 of the flange unit 14 and the joint member 67, and is configured to push outwards and bias the two components (i.e., the main body 20 and joint member 67) apart in the vertical direction. The spring 106 biases the flange main body 20 and the joint member 67 in a direction to enlarge the interval between them. As a result, because of the biasing action of the spring 106, the pump unit 16 is elastically pushed flush against the bottom wall 12b of the fuel tank 12.

The guide pillar 96 is inserted into the spring 106 with a slight space between the outer circumferential periphery of the guide pillar 96 and the inner circumferential periphery of the coiled portion of spring 106. Also, the spring 106 is disposed within the supporting tubular portion 43 of the stand-off portion 42, more specifically, in a space enclosed by the plurality of inwardly projecting guide ribs 48. As shown in FIGS. 5 and 7, the plurality of the guide ribs 48 are arranged around the spring 106 and each of the guide ribs 48 is immediately adjacent to the outer circumferential periphery of the coiled portion of the spring 106. As a result, the spring 106 is held in place with respect to its radial orientation, and is thereby guided in the axial direction by the plurality of the guide ribs 48 and the guide pillar 96 when the spring 106 extends or contracts.

The stand-off portion 42 of the flange main body 20 of the flange unit 14 and the stopper portion 99 of the joint member 67 face opposite to each other in the vertical up-to-down direction with a predetermined vertical interval in between the two components (see the middle drawing of FIG. 5) when the fuel supply device 10 is installed in the fuel tank 12 (see FIGS. 2 to 5). Although not illustrated, the fuel supply piping leading to an engine is connected to an upper end of the outlet port 28 of the flange main body 20. An external connector from an electrical supply source is connected to the upper connector tubular portion 31 of the electrical connector 30. The evaporation port 38 of the flange main body 20A is connected with a fuel vapor piping member composed of a hose leading to a canister or other vessel for storing evaporated fuel. The canister includes adsorbents (for example, activated carbon) capable of adsorbing and desorbing fuel vapor generated within the fuel tank 12. The fuel vapor generated within the fuel tank 12 is discharged into the canister as the fuel vapor control valve of the fuel vapor valve 24 opens.

Hereinafter, the operation of the fuel supply device 10 will be described. The fuel pump 65 sucks both fuel from within the fuel tank 12 as well as fuel from within the sub-tank 63 through the fuel filter 71, and pressurizes said fuel when the fuel pump 65 is driven by the drive power supplied from the outside through the electrical connector 30 and flexible wires 79. The pressure regulator 82 regulates the pressure of the fuel to which the fuel is pressurized and discharges said pressurized fuel into the piping member 83. Subsequently, the fuel is supplied to a vehicle engine through the outlet port 28 of the flange unit 14.

Hereinafter, a method for installing the fuel supply device 10 to the fuel tank 12 will be described. The fuel supply device 10 is brought into the extended state, where the sub-tank 63 may be fully rotated in the counter-clockwise direction about shaft 89 from the horizontal state (see FIG. 4) so that it extends vertically, before it is installed in the fuel tank 12. More specifically, the pump unit 16 is brought into a state to be suspended from the flange unit 14. Rotation in the Y2 direction causes the joint member 67 of the pump unit 16 to move downwardly with respect to the flange main body 20 of the flange unit 14, where as described the joint member 67 is prevented from being removed from the right connecting shaft 22(2) by the shaft anti-removal member 104. More specifically, the interval between the flange main body 20 and the joint member 67 is at its maximum in this state.

Figure 8:
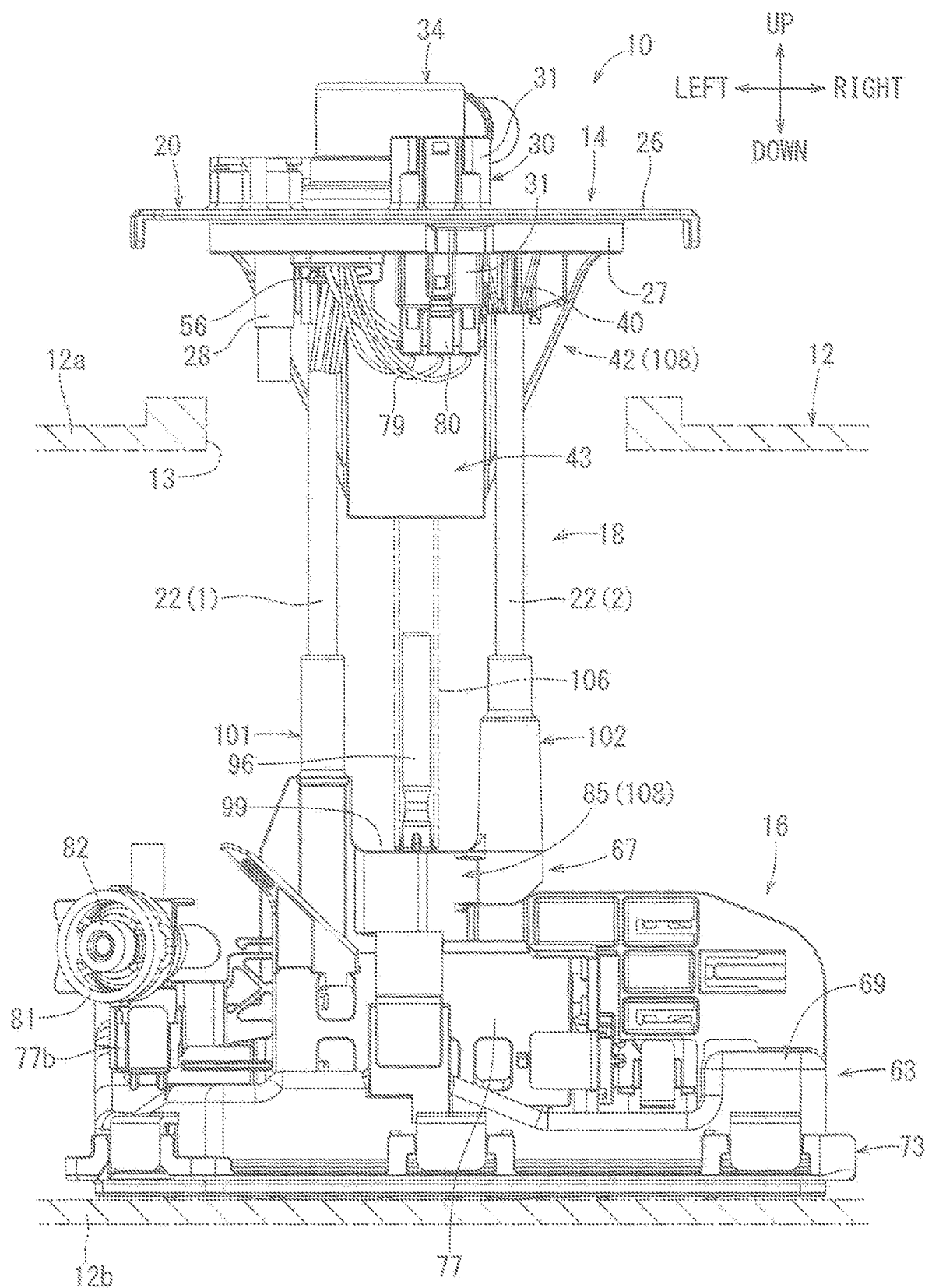
FIG. 8 is a front view of the fuel supply device in course of installation to a fuel tank.
Figure 9:
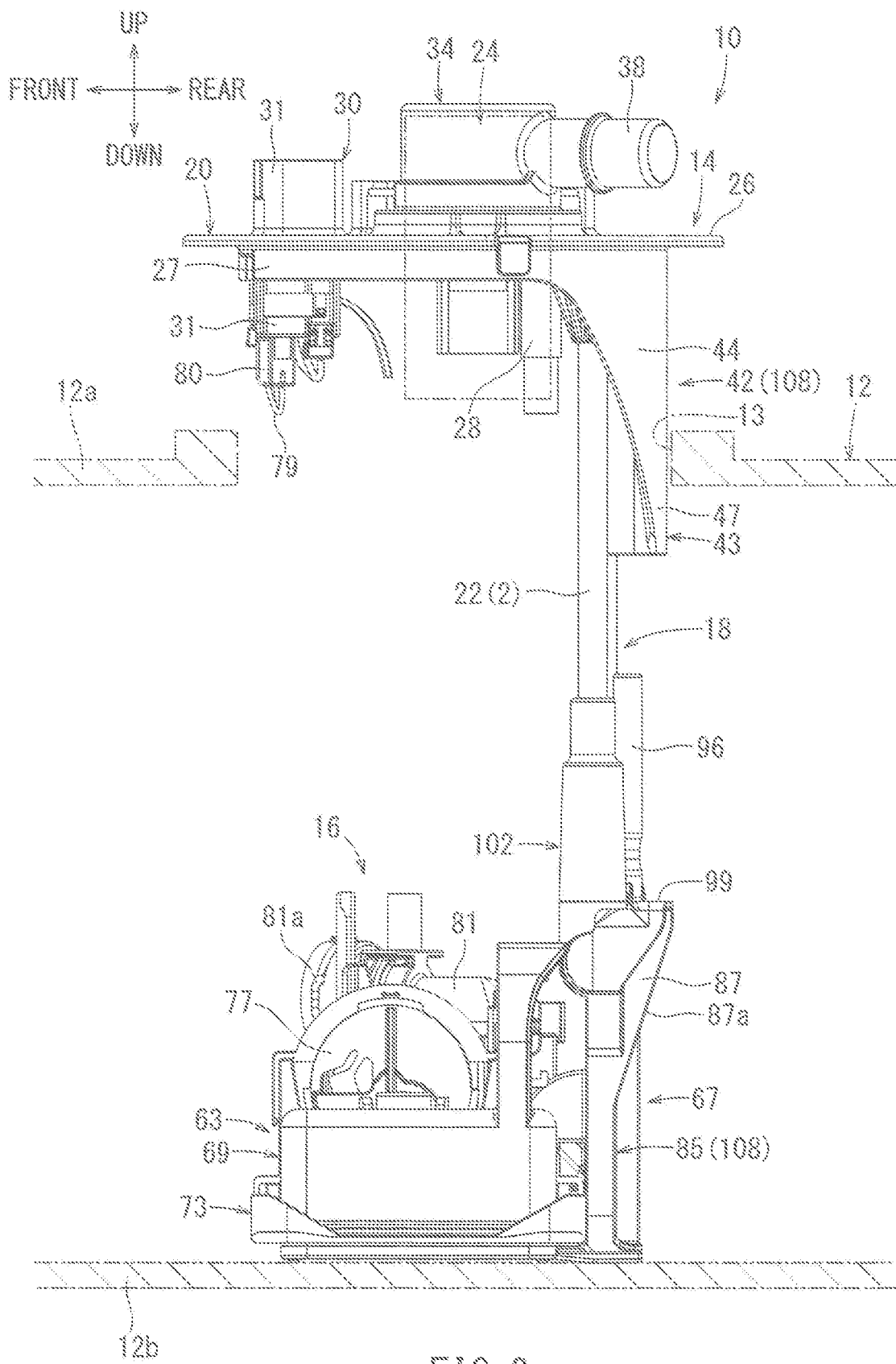
FIG. 9 is a right side view of the fuel supply device in course of installation to the fuel tank.
Figure 11:
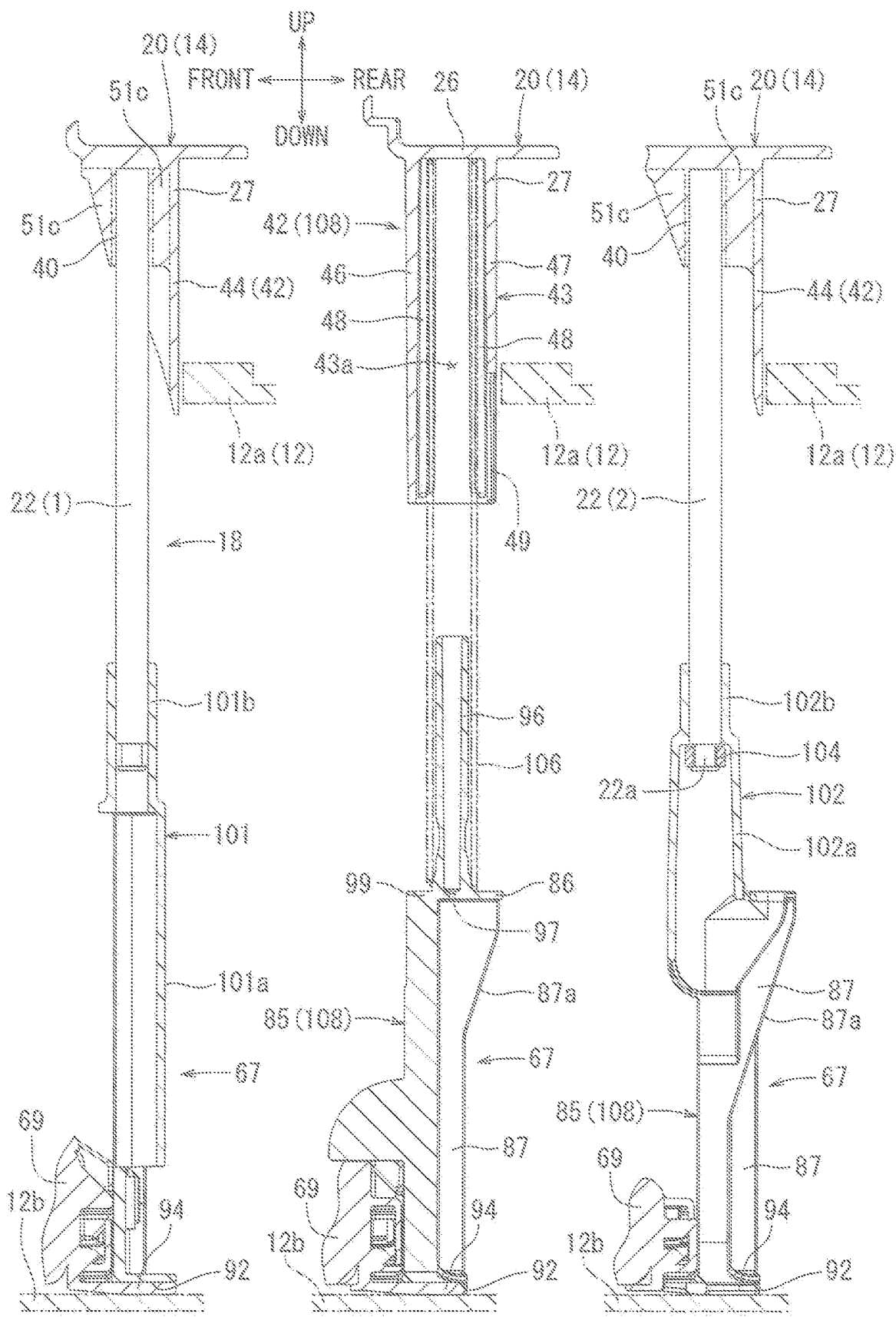
FIG. 11 is a descriptive view showing the relationship between the both connecting shafts and the interval restricting means in course of installation of the fuel supply device to the fuel tank.

Subsequently, the fuel supply device 10 in this vertically maximally extended state is lowered from above and inserted into the opening 13 of the fuel tank 12. Upon contact with the bottom of the fuel tank 12b, the sub-tank 63 rotates in Y1 about the shaft 89, in said direction until it reaches the horizontal state with respect to the joint member 67 within the fuel tank 12 (see the arrow Y1 in FIG. 4, wherein the state shown of sub-tank 63 in FIG. 4 is the horizontal state), wherein the sub-tank 63 is placed flush against the bottom wall 12b of the fuel tank 12. Upon reaching this state, the anti-rotation surface 92 of the joint member 67 comes in contact with the anti-rotation portion 94 of the bottom cover 73 for the sub-tank 63, preventing any further rotation in the Y1 direction. Thus, this configuration maintains the sub-tank 63 in the horizontal state, where the bottom cover 73 of the sub-tank 63 is flush with and directly abuts the bottom wall 12b of the fuel tank 12. This state is shown in FIG. 8 to FIG. 11. The left drawing of FIG. 11 shows the surrounding area of the left connecting shaft, the middle drawing of FIG. 11 shows the surrounding area of an interval restricting mechanism, and the right drawing of FIG. 11 shows the surrounding area of the left connecting shaft. In FIGS. 8 to 10, the piping member 83 is omitted.

As shown in FIGS. 8 and 9, the vertical interval between the flange main body 20 and the joint member 67 is maximum in the horizontal state. In this state, the connection connector 80 connected to the electrical connector 30 of the flange main body 20 is positioned above the opening 13 of the fuel tank 12. Therefore, the connection connector 80 is positioned at a place where it will not interfere with the opening edge around the opening 13 of the fuel tank 12. Folded portions of the wirings 79 on the side of the connection connector 80, which are relayed through the hook 56 of the flange main body 20 onward to left connecting shaft 22(1) are also positioned at a place where they do not interfere with the opening edge around the opening 13 of the fuel tank 12.

As shown in FIGS. 9 and 10, a lower end of the supporting tubular portion 43 of the stand-off portion 42 of the flange main body 20 is positioned lower than the opening 13 of the fuel tank 12. Therefore, the lower end of the supporting tubular portion 43 of the stand-off portion 42 is positioned within and extends downward into the opening 13 of the fuel tank 12.

When the fuel device 10 is being inserted downward into the tank 12, the joint member 67 may be shifted rearward (to the right in FIG. 9) with respect to the opening edge around the opening 13 of the fuel tank 12 when the pump unit 16 is inserted into the fuel tank 12. In this case, the plurality of tapered and inclined edges 87a of the projecting strip portions 87 come in contact with and smoothly slide on the opening edge around the opening 13. In this manner, with the projecting strip portions 87 acting as a guide, the joint member 67 may be smoothly inserted into the opening 13.

Subsequently, the flange unit 14 is pushed down against the biasing force of the spring 106, which is biased towards pushing the flange unit 14 upwards in the vertical direction, while the flange unit 14 is positioned at a concentric position with the opening 13 of the fuel tank 12. At this time, the rear wall 47 and the triangular walls 44 of the supporting tubular portion 43 due to their respective narrowing and tapered shapes also serve as a guide for the flange unit 14, while the flange unit 14 is inserted into the opening 13, so that it may be smoothly inserted into said opening.

As shown in FIGS. 2 to 5, the fitting tubular portion 27 of the flange main body 20 of the flange unit 14 is fitted into the opening 13 of the upper wall 12a of the fuel tank 12. In this state, the outer periphery around the flange main body 20 of the flange unit 14 is fixed to the upper wall 12a of the fuel tank 12 by a fixing means (not shown) such as a fixing metal fitting or bolts. Consequently, the opening 13 of the fuel tank 12 may be closed while the sub-tank 63 is maintained to be pushed against the bottom wall 12 of the fuel tank 12 by the biasing force of the spring 106. As described above, the installation of the fuel supply device 10 to the fuel tank 12 is thereby completed. This state represents the installed state of the fuel supply device 10 into fuel tank 12.

Nevertheless, the fuel tank 12 may experience deformation, i.e. expansion and contraction, in response to variation of the internal pressure in the tank due to a variation of temperature and/or amount of fuel. This deformation may vary (increases and decreases) the height of the fuel tank 12, i.e. the vertically spaced apart interval between the upper wall 12a and the bottom wall 12b. In this case, the flange unit 14 and the pump unit 16 may move relative to each other in the vertical direction via the connecting mechanism 18 to adjust to any such deformation, so that the flange unit 14 and the pump unit 16 may conform their shape to the variation of the height of the fuel tank 12, and still be able to function. Consequently, the sub-tank 63 of the pump unit 16 is maintained to be pushed against the bottom wall 12b of the fuel tank 12 by a biasing force of the spring 106.

Figure 12:
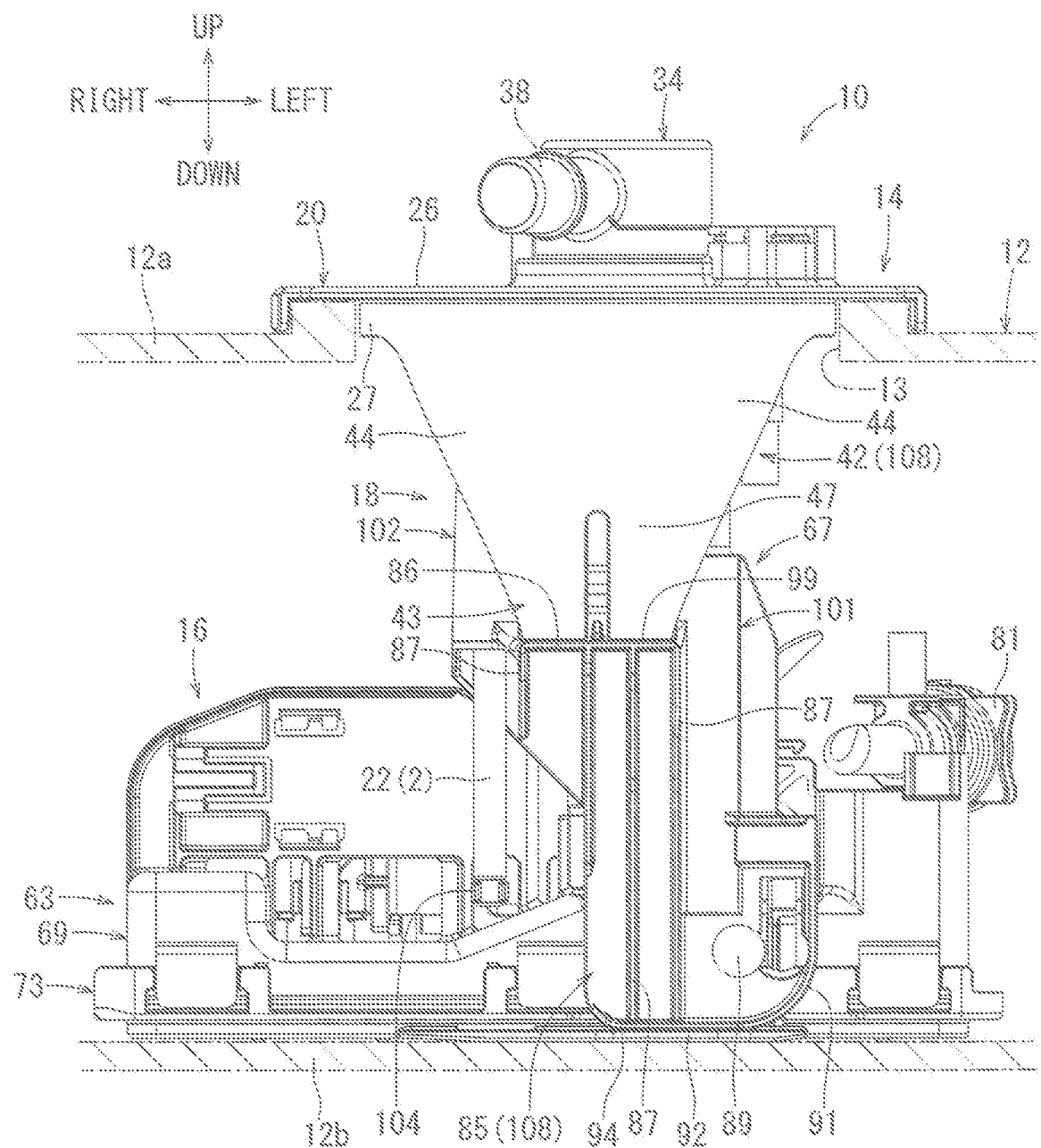
FIG. 12 is a rear view showing the fuel supply device in a minimum height state.
Figure 13:
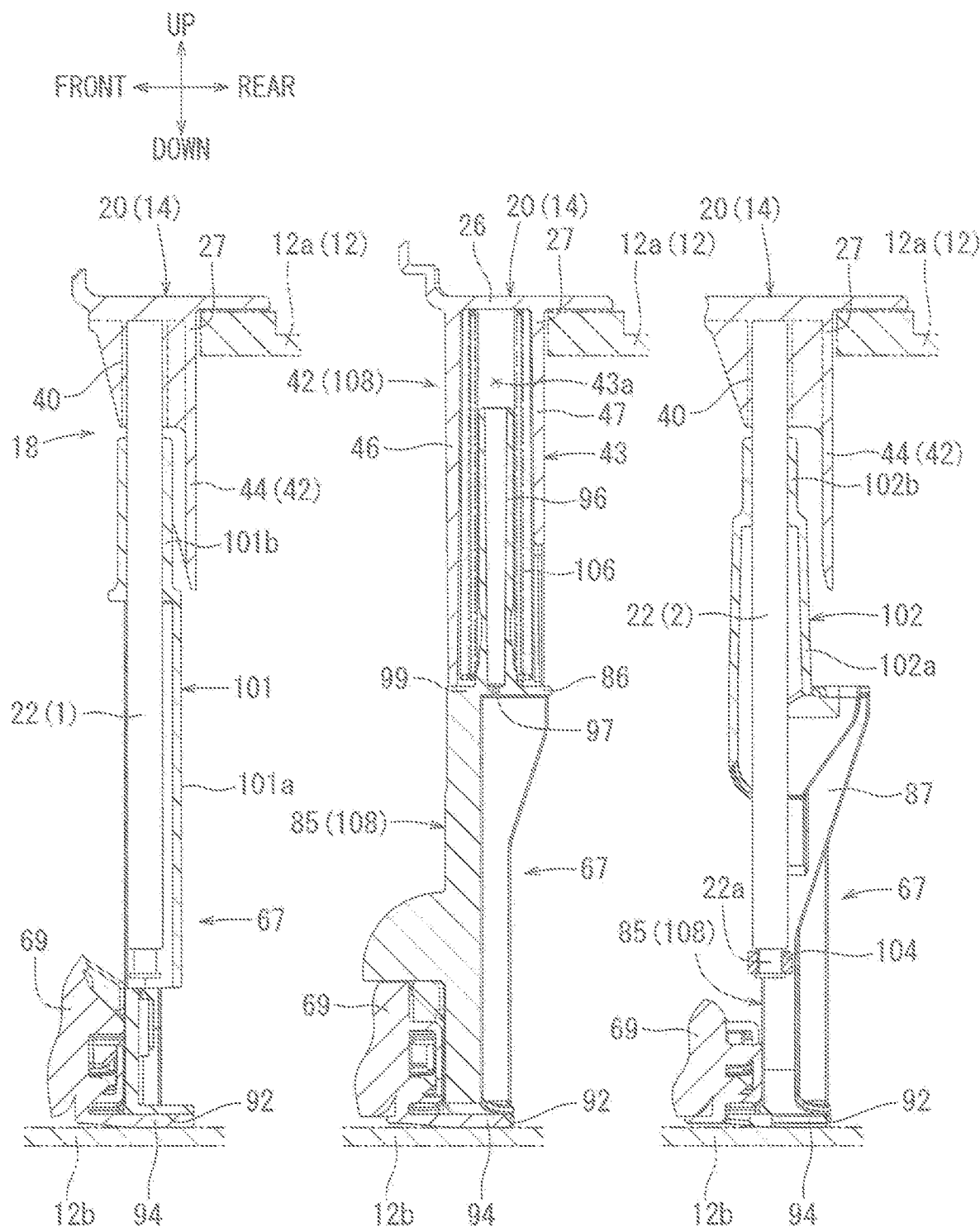
FIG. 13 is a descriptive view showing the relationship between the both connecting shafts and the interval restricting means when the fuel supply device is in the minimum height state.

Further, the lower end of the supporting tubular portion 43 of the stand-off portion 42 at the flange main body 20 of the flange unit 14 comes in contact with the stopper portion 99 of the connecting plate 85 of the joint member 67 when the fuel tank 12 experiences excessive vertical contraction. This state is shown in FIGS. 12 and 13. The left drawing of FIG. 13 shows a surrounding area of the left connecting shaft, the middle drawing of FIG. 13 shows a surrounding area of the interval restricting mechanism and the right drawing of FIG. 13 shows a surrounding area of the left connecting shaft 22(2).

As shown in FIG. 12 and the middle drawing of FIG. 13, in this state, the stand-off portion (upper contact portion) 42 of the flange main body 20 and the connecting plate portion (lower contact portion) 85 of the joint member 67 serve as a tension rod, to prevent further contraction. This configuration may thus limit the minimum vertical interval between the flange main body 20 and the joint member 67. More specifically, this configuration may delineate a minimum height for the fuel supply device 10. In this manner, the interval restricting means (denoted with reference numeral 108) may comprise the stand-off portion 42 and the connecting plate 85.

The stress caused by contraction when the supporting tubular portion 43 of the stand-off portion 42 at the flange main body 20 contacts the connecting plate 85 of the joint member 67, can be distributed by both of the triangular walls 44 of the stand-off portion 42 (see FIG. 12), across the breadth of its surface area. Further, the lower ends of the both connecting shafts 22(1) and 22(2) do not interfere with the other members when the supporting tubular portion 43 of the stand-off portion 42 at the flange main body 20 contacts with the stopper portion 99 of the connecting plate 85 of the joint member 67 (see the left and right drawings of FIG. 13).

According to the present embodiment, in reference to flange main body 20 as a cover member for the fuel tank, the connector tubular portion 31 of the electrical connector 30 is formed as described above to be non-contiguous with the ribs 51 of the cover plate 26 (see FIG. 15). Therefore, the tensile stress caused by the flexural deformation of the flange main body 20 is not applied to the base portion of the connector tubular portion 31 from the ribs 51. As a result, the concentration of stress applied to the ribs 51 does not traverse to the connector tubular portion 31 of the flange main body 20.

The connector tubular portion 31 and the ribs 51 are arranged within the radial interior of the fitting tubular portion 27 of the cover plate 26, and as such are susceptible to deformation of the fuel tank 12. Therefore, the force applied on the base portion of the connector tubular portion 31 due to the deformation of the fuel tank 12 may be effectively prevented. More specifically, the outer periphery of the cover plate 26 is hardly susceptible to deformation of the fuel tank 12 since it is firmly fixed to the upper wall 12a of the fuel tank 12 via a fixing means (not shown) such as a fixing metal fitting or bolts. On the other hand, the radial interior of the fitting tubular portion 27 on the cover plate 26 is susceptible to the deformation of the fuel tank 12. Consequently, although the connector tubular portion 31 and the ribs 51 are arranged inside of the fitting tubular portion 27 on the cover plate 26, wherein the inside is susceptible to the deformation of the fuel tank 12, it is possible to effectively relieve the concentration of stress that is applied to the base portion of the connector tubular portion 31 and applied due to the deformation of the fuel tank 12.

In particular, the accommodating tubular portion 35 of the valve accommodating portion 34 is formed to be non-contiguous with the ribs 51 of the cover plate 26 (see FIG. 15). Therefore, the tensile stress caused by the flexural deformation of the flange main body 20 is absorbed and passed onward by the ribs 51, and is not applied on the base portion of the accommodating tubular portion 35 from the ribs 51. As a result, similar to above, the concentration of stress applied to the ribs 51 does not traverse to the accommodating tubular portion 35.

The accommodating tubular portion 35 and the ribs 51 are arranged inside of the fitting tubular portion 27 on the cover plate 26, wherein as described above the radial interior of the fitting tubular portion 26 is susceptible to the deformation of the fuel tank 12. It is possible to effectively relieve the concentration of stress that is applied to the base portion of the accommodating tubular portion 35 and applied due to the deformation of the fuel tank 12. More specifically, since the outer periphery of the cover plate 26 is firmly fixed to the upper wall 12a of the fuel tank 12 via a fixing means (not shown) such as a fixing metal fitting or bolts, it is hardly susceptible to the deformation of the fuel tank 12. On the other hand, the radial interior of the fitting tubular portion 27 on the cover plate 26 is susceptible to the deformation of the fuel tank 12. Although the accommodating tubular portion 35 and the ribs 51 are arranged inside of the fitting tubular portion 27 on the cover portion 26, wherein the inside is susceptible to the deformation of the fuel tank 12, it is possible to effectively relieve the concentration of stress that may be applied to the base portion of the accommodating tubular portion 35 and applied due to the deformation of the fuel tank 12.

A fuel vapor valve 24 may be accommodated in the accommodating tubular portion 35 of the valve accommodating portion 34, and the fuel vapor valve 24 can be attached to the both attachment pieces 37 (see FIG. 16).

According to the above-described fuel supply device 10, the interval restricting mechanism 108 is provided between the flange main body 20 of the flange unit 14 and the joint member 67 of the pump unit 14, wherein the interval restricting mechanism 108 is comprised of the stand-off portion 42 and the connecting plate 85 such that it may limit the minimum vertical interval there between by their mutual abutment, as the bottom of portion 42 and the top of plate 85 would reciprocally abut each other upon contraction of the tank 12. Therefore, the minimum vertical interval between the flange main body 20 and the joint member 67 can be limited by abutting the stand-off portion 42 and the connecting plate 85 of the interval restricting means 108 when the fuel tank 12 is excessively contracted (see FIGS. 12 and 13). The connecting shafts 22 are not used as the interval restricting mechanism 108, therefore, the deformation of the flange main body 20 due to the connecting shafts 22 can be prevented. Accordingly, it is possible to prevent the deformation of the flange main body 20 of the flange unit 14 while the excessive contraction of the fuel tank 12 in the height direction is restricted.

The stand-off portion 42 is integrally formed with the flange main body 20 while the connecting plate 85 may constitute a main body of the joint member 67. Therefore, the interval restricting means 108 can be constituted without increasing the number of components.

The stand-off portion 42 suspends from the flange portion 20 and may have such a shape that is tapered downward at its rear, where it narrows in the up-to-down direction in the left-right up-down directional plane. With this configuration, the stress applied to the flange main body 20 can be dispersed by the mutual abutment of the stand-off portion 42 and the connecting plate 85 of the interval restricting mechanism 108, where in particular the shape of the stand-off portion 42 may be able to spread the stress due to its large triangular surface area (e.g., walls 44). As a result, the deformation that may be caused by the stress concentration of the flange main body 20 can be prevented.

The stand-off portion 42 is configured in a diagonally truncated semi-cylindrical shape (see FIG. 14). Consequently, the stand-off portion 42 can be formed along the outer periphery of the flange main body 20.

The flange main body 20 includes the fitting tubular portion 27 which is fitted into the opening 13 of the fuel tank 12, and the stand-off portion 42 is formed utilizing a part of the fitting tubular portion 27 (see FIG. 14). Therefore, at least a portion of the fitting tubular portion 27 can also be used as a part of the stand-off portion 42.

A vertically extending hollow section 43a is formed in the stand-off portion 42 (see FIG. 14). Therefore, the weight of the stand-off portion 42 may be reduced when compared with the case where the stand-off portion 42 is formed as a solid body. Further, an upper portion of the spring 106 may be fitted utilizing the hollow section 43a of the stand-off portion 42.

The electrical connection connector 80 of the fuel pump 65, wherein the connector 80 is connected to the electrical connector 30 of the flange main body 20, is arranged at a higher position than the opening 13 of the fuel tank 12 when the pump unit 16 is placed within the fuel tank 12 where the interval between the flange main body 20 and the joint member 67 is at its maximum (see FIGS. 8 and 9). Therefore, the connection connector 80 is prevented from being caught between the opening edge around the opening 13 of the fuel tank 12 and the flange main body 20 when the fuel supply device 10 is installed to the fuel tank 12, where it will not interfere with the opening edge around the opening 13 of the fuel tank 12.

As mentioned, a plurality of the guide ribs 48 are formed on the inner peripheral surface of the supporting tubular portion 43 of the stand-off portion 42 at the flange main body 20, wherein the guide ribs 48 are configured to guide the spring 106 that biases the flange main body 20 and the joint member 67 to increase the vertical interval there between in the axial up-to-down direction (see FIG. 7). Therefore, since the spring 106 is guided by the plurality of the guide ribs 48, the guiding function for the spring 106 i.e., the function for preventing the spring 106 from buckling can be ensured even if the supporting tubular portion 43 is longer. Further, the surface area of the aforementioned ovular cross-sectional area of the hollow section 43a in the supporting tubular portion 43 is increased since the plurality of the guide ribs 48 on the inner peripheral surface of the supporting tubular portion 43. Consequently, the strength and the durability of the hollow section die 61 can be ensured, and the moldability of the supporting tubular portion 43 can be improved even when the supporting tubular portion 43 is longer. Further, a passage for cooling can be easily formed in the hollow section die 61 by increasing the cross-sectional area of the hollow section die 61. Accordingly, it is possible to improve the moldability of the supporting tubular portion 43 while the guiding function for the spring 106 is ensured even if the supporting tubular portion 43 of the flange main body 20 is longer. In addition, since the moldability of the supporting tubular portion 43 is improved, the accuracy in size of the supporting tubular portion 43 can be improved.

An axially extending slit groove 49 is formed at the supporting tubular portion 43 of the stand-off portion 42 (see FIG. 4). Therefore, the slit groove mold part 60 for molding the slit groove can support the hollow section die 61 to the outer die 59 that is used for molding the outer surface of the supporting tubular portion 43 (see FIG. 17). Having the slit groove molding part 60 as part of the outer die 59 may prevent the hollow section die 61 from tilting so as to improve the accuracy in size of the supporting tubular portion 43 even when the hollow section die 61 is longer.

As shown in FIG. 4, the flange main body 20 includes the fitting tubular portion 27 which is fitted into the opening 13 of the fuel tank 12. The supporting tubular portion 43 is formed utilizing a part of the fitting tubular portion 27. Therefore, a part of the fitting tubular portion 27 can also be used as a part of the supporting tubular portion 43.

As referring FIGS. 9 and 10, the lower end of the supporting tubular portion 43 of the stand-off portion 42 is arranged at a lower position than the opening 13 of the fuel tank 12 when the pump unit 16 is initially placed within the fuel tank 12 while the interval between the flange main body 20 and the joint member 67 is at its maximum. Therefore, because the spring 106 is shielded and surrounded by supporting tubular portion 43, it is possible to prevent the spring 106 from coming into contact with the opening edge around the opening 13 of the fuel tank 12 when installing the fuel supply device 10 to the fuel tank 12. In this way, this structural configuration prevents the installation of the device 10 into the fuel tank 12 from generating noise and damage around the opening 13 that may be caused by the contacting of the spring 106 with the opening edge around the opening 13 of the fuel tank 12.

The fuel supply device 10 is not limited to be applied to a vehicle such as an automobile but may also be applied to the other vehicles. The number of components provided for each of the units 14 and 16 for the fuel supply device 10 may be appropriately increased or reduced and/or the components may be modified. The joint member 67 may be fixed to the pump casing 77 or the tank main body 69 of the sub-tank 63, or integrally formed with the pump casing 77 or the tank main body 69 of the sub-tank 63. The pump-side unit may not be limited to the pump unit 16 according to the exemplary embodiments, but may be of the type having a cup-like sub-tank and a fuel pump disposed within the sub-tank. The connecting mechanism 18 may be appropriately modified as far as it is configured as a mechanism for connecting the joint member 67 to the flange main body 20 so as to be movable in the vertical direction.

The configuration of the stand-off portion 42 and/or the connecting plate 85 for the interval restricting means 108 may also be appropriately modified. For example, both of the triangular walls 44 may be omitted so that the stand-off portion 42 may be formed merely with the supporting tubular portion 43. Additionally, the stand-off portion 42 may be formed as a separate construction from the fitting tubular portion 27. The supporting tubular portion 43 is not limited to have an ovular cylindrical cross-section but may be modified to have a cylindrical- or rectangular tubular cross-section, C-shaped cylindrical cross-section, or the like. The supporting tubular portion 43 as a pillar portion, instead of being hollow, may be formed to have a solid body or may be formed as a plate. The front wall 46 of the supporting tubular portion 43 may be omitted. In this case, the supporting tubular portion 43 may be formed to have a cylindrical cross-section (instead of a semi-circular cross-section), a diagonally truncated cylindrical shape or the like utilizing the entire fitting tubular portion 27. The stand-off portion 42 may be formed in a trapezoidal shape such as a truncated pyramid, truncated cone, or the like. The connecting plate 85, particularly an upper portion which contacts the lower portion of the stand-off portion 42 may be formed in a trapezoidal shape such as a truncated pyramid, truncated cone, or the like.

A valve device except the fuel vapor valve 24 or components other than the valve device may be used as a component that can be accommodated in the valve accommodating portion 34. A component other than the both attachment pieces 37 may be used for attaching the fuel vapor valve 24 to the accommodating tubular portion 35 of the valve accommodating portion 34.

The various exemplary embodiments described above in detail with reference to the accompanying drawings are intended to be representative of the present invention and thus non limiting embodiments. The detailed description is intended to teach a person of skill in the art to make, use and/or practice various aspects of the present teachings and thus does not limit the scope of the invention in any manner. Furthermore, each of the additional features and teachings disclosed above may be applied and/or used separately or with other features and teachings in any combination thereof, to provide improved cover members for fuel tanks and/or methods of making and using the same.

The invention claimed is:

1. A cover member for a fuel tank, the cover member comprising:
a cover plate configured to close an opening of the fuel tank, wherein the cover plate includes a top side and bottom side;
a first tubular portion formed at the cover plate, wherein the first tubular portion extends from the bottom side of the cover plate in a plate thickness direction; and
a grid of ribs disposed along the bottom side of the cover plate, wherein the grid is non-contiguous with the first tubular portion.

2. The cover member of claim 1, further comprising a second tubular portion on the bottom side of the cover plate wherein the second tubular portion is configured to be fitted into the opening of the fuel tank, and wherein the first tubular portion and the rib are arranged inside of the second tubular portion along the bottom side.

3. The cover member of claim 1, wherein the first tubular portion is configured to accommodate an electrical connector or a valve device.

4. The cover member of claim 3, wherein the first tubular portion is configured to accommodate a fuel vapor valve.

5. A cover member for a fuel tank, the cover member comprising:
a disc-shaped circular cover plate configured to close an opening of the fuel tank, with a circular cross-section in a left-right front-rear directional plane, and a plate thickness direction perpendicular to the circular cross-section in an up-to-down direction;
a first tubular portion formed at the cover plate so as to extend in the plate thickness direction; and
a plurality of ribs formed on the cover plate and extending in the plate thickness direction, wherein the plurality of ribs interconnect to form a grid that is non-contiguous with the first tubular portion.

6. The cover member of claim 5, wherein the first tubular portion extends from above the cover plate, through an entire thickness of the cover plate, where a lower terminus of the first tubular portion reaches below the cover plate.

7. The cover member of claim 5, further comprising a second tubular portion configured to be fitted into the opening of the fuel tank, and
wherein the first tubular portion and the grid are arranged within a radial interior of the second tubular portion.

8. The cover member of claim 7, wherein the second tubular portion forms an inner circumferential ring with a diameter smaller than a circumferential outer periphery of the disc shaped cover member, wherein the inner circumferential ring is concentric with the cover plate, and wherein the inner circumferential ring projects downward vertically from the cover plate.

9. The cover member of claim 7, wherein the plurality of ribs are not formed on an upper side of the cover plate, and where the second tubular portion is formed on an underside of the cover plate.

10. The cover member of claim 5, wherein the first tubular portion is configured to accommodate a component, and wherein the first tubular portion includes an attachment portion configured to attach the component to the cover member.

11. The cover member of claim 10, wherein the attachment portion is at a lower portion of the first tubular portion and wherein the attachment portion comprises two elastically deformable tabs that extend vertically downward from an underside of the cover plate.

12. The cover member of claim 11, wherein the two elastically deformable tabs are located on opposite diametrical ends of the first tubular portion, and are configured to attach the component to the cover member in a snap-fit configuration.

13. A cover member for a fuel tank, the cover member comprising:
a disc-shaped circular cover plate configured to close an opening of the fuel tank, wherein the cover plate comprises a circular cross-section in a left-right front-rear directional plane and a plate thickness direction perpendicular to the cross-section in the up-to-down direction;
a first tubular portion formed at the cover plate so as to extend in the plate thickness direction;
an evaporation port extending from an upper end of the first tubular portion; and
a plurality of ribs that form a grid on the cover plate, wherein the grid is non-contiguous with the first tubular portion.

14. The cover member of claim 13, wherein entirety of the evaporation port is above an upper surface of the cover plate.

15. The cover member of claim 13, further comprising a hose and a canister, wherein the hose has one end connected to the evaporation port and another end connected to the canister.

16. The cover member of claim 15, wherein the canister is configured to receive a flow of evaporated fuel from the cover plate when the cover plate is attached to the fuel tank.

17. The cover member of claim 13, further comprising an electrical connector, including a plurality of adjacent polygonal tubes, wherein the electrical connector extends through the cover plate along the plate thickness direction from an upper surface of the cover plate to an underside of the cover plate, and wherein the electrical connector terminates below the cover plate in the up-to-down direction.

18. The cover member of claim 17, wherein the rid is non-contiguous with the electrical connector.

19. The cover member of claim 13, comprising a hook extending in a left-to-right direction projecting from an underside of a rib of the plurality of ribs, wherein the hook is configured to hold electrical wires, and wherein an entirety of the hook is below an underside of the cover plate.

20. The cover member of claim 5, wherein the first tubular portion is configured to accommodate an electrical connector or a valve device.

\* \* \* \* \*